(12) United States Patent
Taherzadeh Boroujeni et al.

(10) Patent No.: US 12,068,890 B2
(45) Date of Patent: Aug. 20, 2024

(54) MEASUREMENT OF POWER LEVEL OF DEMODULATION REFERENCE SIGNAL PRIOR TO BLIND DECODING OF ASSOCIATED PHYSICAL DOWNLINK CONTROL CHANNEL

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/368,644

(22) Filed: Jul. 6, 2021

(65) Prior Publication Data

US 2022/0014397 A1   Jan. 13, 2022

Related U.S. Application Data

(60) Provisional application No. 63/049,779, filed on Jul. 9, 2020.

(51) Int. Cl.
*H04L 25/02* (2006.01)
*H04L 5/00* (2006.01)
(Continued)

(52) U.S. Cl.
CPC ........ *H04L 25/0238* (2013.01); *H04L 5/0048* (2013.01); *H04W 24/08* (2013.01); *H04W 72/23* (2023.01)

(58) Field of Classification Search
CPC . H04L 25/0238; H04L 5/0048; H04L 5/0094; H04L 5/0051; H04L 5/0053; H04L 1/0038; H04W 24/08; H04W 72/23
See application file for complete search history.

(56) References Cited

U.S. PATENT DOCUMENTS 10,644,914 B2   5/2020   Medles et al.
2014/0169209 A1*   6/2014   Imamura ................ H04B 17/24
                                                          370/252

(Continued)

FOREIGN PATENT DOCUMENTS

CN      109660315 A     4/2019
WO      2015038043 A1   3/2015

OTHER PUBLICATIONS

"Dynamic PDCCH Adaptation Based on DMRS Detection for UE Power Saving in 5G New Radio," 2019 IEEE 90th Vehicular Technology Conference (VTC2019-Fall), Honolulu, HI, USA, 2019 (Year: 2019).*

(Continued)

*Primary Examiner* — Ian N Moore
*Assistant Examiner* — Sun Jong Kim
(74) *Attorney, Agent, or Firm* — Loza & Loza LLP

(57) ABSTRACT

A scheduled entity measures a power level of a demodulation reference signal (DMRS) prior to blind decoding a physical downlink control channel (PDCCH) candidate associated with the DMRS. The scheduled entity performs blind decoding of the PDCCH candidate if the power level is above a predetermined threshold or foregoes blind decoding if the power level is below the predetermined threshold. A scheduling entity transmits a blind decoding configuration setting to the scheduled entity. The scheduling entity enables, via the blind decoding configuration setting, measurement, at the scheduled entity, of power levels of a plurality of DMRSs prior to blind decoding a plurality of respective PDCCH candidates associated with the plurality of DMRSs. Only PDCCH candidates associated with DMRSs having power levels that are above the predetermined threshold are blind decoded. A predetermined number of PDCCH candidates are scheduled for blind decoding.

(Continued)

Blind decoding stops when the predetermined number is reached.

22 Claims, 11 Drawing Sheets

(51) Int. Cl.
*H04W 24/08* (2009.01)
*H04W 72/23* (2023.01)

(56) References Cited

U.S. PATENT DOCUMENTS

| | | | |
|---|---|---|---|
| 2018/0167920 A1* | 6/2018 | Kim | H04L 1/0038 |
| 2018/0176059 A1* | 6/2018 | Medles | H04W 72/54 |
| 2019/0223164 A1* | 7/2019 | He | H04L 5/00 |
| 2019/0334681 A1 | 10/2019 | Xu et al. | |
| 2020/0128448 A1* | 4/2020 | Müller | H04W 36/0058 |
| 2020/0145918 A1* | 5/2020 | Ji | H04W 52/0216 |
| 2021/0185651 A1* | 6/2021 | Seo | H04W 72/23 |
| 2021/0352466 A1* | 11/2021 | Hu | H04W 72/23 |
| 2022/0217628 A1* | 7/2022 | Shubhi | H04W 52/028 |

OTHER PUBLICATIONS

International Search Report and Written Opinion—PCT/US2021/040730—ISA/EPO—Oct. 26, 2021.

* cited by examiner

MEASUREMENT OF POWER LEVEL OF DEMODULATION REFERENCE SIGNAL PRIOR TO BLIND DECODING OF ASSOCIATED PHYSICAL DOWNLINK CONTROL CHANNEL

CLAIM OF PRIORITY UNDER 35 U.S.C. § 119(e)

The present Application for Patent claims priority to provisional application No. 63/049,779 titled "Hybrid Blind Decoding and Corresponding Blind Decoding Limits" filed in the United States Patent and Trademark Office on Jul. 9, 2020, and assigned to the assignee hereof and hereby expressly incorporated by reference herein as if fully set forth below and for all applicable purposes.

TECHNICAL FIELD

The technology discussed below relates generally to wireless communication systems, and more particularly, improvements in blind decoding of various radio communication channels.

BACKGROUND

Control information conveyed by communication channels, such as a physical downlink control channel (PDCCH), is vital to proper allocation and decoding of data channels, such as a physical downlink shared channel (PDSCH). To access the control information (e.g., downlink control information (DCI)), a user equipment (UE) may first decode the PDCCH. However, decoding the PDCCH is a relatively complex task. For example, the UE may need to determine a location of the PDCCH by identifying a control channel element (CCE) index value that identifies the starting position of the PDCCH. The UE may also need to determine an aggregation level, which informs the UE of the number of CCEs used to make up the PDCCH. The UE may also need to determine if and how a base station interleaved the control and data portions of the DCI and determine if the PDCCH candidate was associated with an identifier of the UE. This information may not be provided to the UE by a base station in advance. The only thing known to the UE is information about a given range of CCEs that possibly carries the DCI on a PDCCH candidate.

The UE may need to expend valuable resources when attempting to decode the PDCCH and the DCI carried within that given range, referred to as a search space. Presently, these attempts may be based on trial and error and may be referred to as blind decoding. However, even if correctly decoded, some PDCCHs may have poor signal strength, resulting in poor channel quality and reliability. Testing or filtering PDCCH candidates to remove less than desirable PDCCH candidates from the blind decoding process may lead to improved quality and reliability of DCI conveyed over a PDCCH.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A scheduled entity measures a power level of a demodulation reference signal (DMRS) prior to blind decoding a physical downlink control channel (PDCCH) candidate associated with the DMRS. The scheduled entity blind decodes the PDCCH candidate if the power level is above a predetermined threshold or foregoes blind decoding if the power level is below the predetermined threshold. A scheduling entity transmits a blind decoding configuration setting to the scheduled entity. The scheduling entity enables, via the blind decoding configuration setting, measurement, at the scheduled entity, of power levels of a plurality of DMRSs prior to blind decoding a plurality of respective PDCCH candidates associated with the plurality of DMRSs. Only PDCCH candidates associated with DMRSs having power levels that are above the predetermined threshold are blind decoded. A predetermined number of PDCCH candidates are scheduled for blind decoding. Blind decoding stops when the predetermined number is reached.

In one example, a method of wireless communication at a scheduled entity is disclosed. The method includes measuring a power level of a respective demodulation reference signal (DMRS) prior to a blind decoding of a respective physical downlink control channel (PDCCH) candidate associated with the respective DMRS, and at least one of: performing the blind decoding the respective PDCCH candidate if the power level of the respective DMRS is above a predetermined threshold, or foregoing the blind decoding of the respective PDCCH candidate if the power level of the respective DMRS is below the predetermined threshold.

In another example, a wireless communication device in a wireless communication network is disclosed. The wireless communication device includes a wireless transceiver, a memory, and a processor communicatively coupled to the wireless transceiver and the memory. In one aspect, the processor and the memory are configured to measure a respective power level of a respective demodulation reference signal (DMRS) prior to a blind decoding of a respective physical downlink control channel (PDCCH) candidate associated with the respective DMRS, and at least one of: blind decode the respective PDCCH candidate if the respective power level is above a predetermined threshold, or forego the blind decoding of the respective PDCCH candidate if the respective power level is below the predetermined threshold.

In another example, a method of wireless communication at a scheduling entity is disclosed. The method includes transmitting, to a scheduled entity, a blind decoding configuration setting, and enabling, via the blind decoding configuration setting, measurement, at the scheduled entity, of power levels of a plurality of demodulation reference signals (DMRSs) prior to blind decoding of a plurality of physical downlink control channel (PDCCH) candidates respectively associated with the plurality of DMRSs. The method further includes scheduling a predetermined number of PDCCH candidates for blind decoding by the scheduled entity based on a number of control channel elements (CCEs) in one or more bandwidth parts (BWPs) associated with one or more of the plurality of PDCCH candidates.

In another example, a wireless communication device in a wireless communication network is disclosed. The wireless communication device includes a wireless transceiver, a memory, and a processor communicatively coupled to the wireless transceiver and the memory. In one aspect, the processor and the memory are configured to transmit, to a scheduled entity, a blind decoding configuration setting and enable, via the blind decoding configuration setting, measurement, at the scheduled entity, of power levels of a plurality of demodulation reference signals (DMRSs) prior to blind decoding of a plurality of physical downlink control channel (PDCCH) candidates respectively associated with the plurality of DMRSs. The processor and the memory are configured to schedule a predetermined number of PDCCH candidates for blind decoding by the scheduled entity based on a number of control channel elements (CCEs) in one or more bandwidth parts (BWPs) associated with one or more of the plurality of PDCCH candidates.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
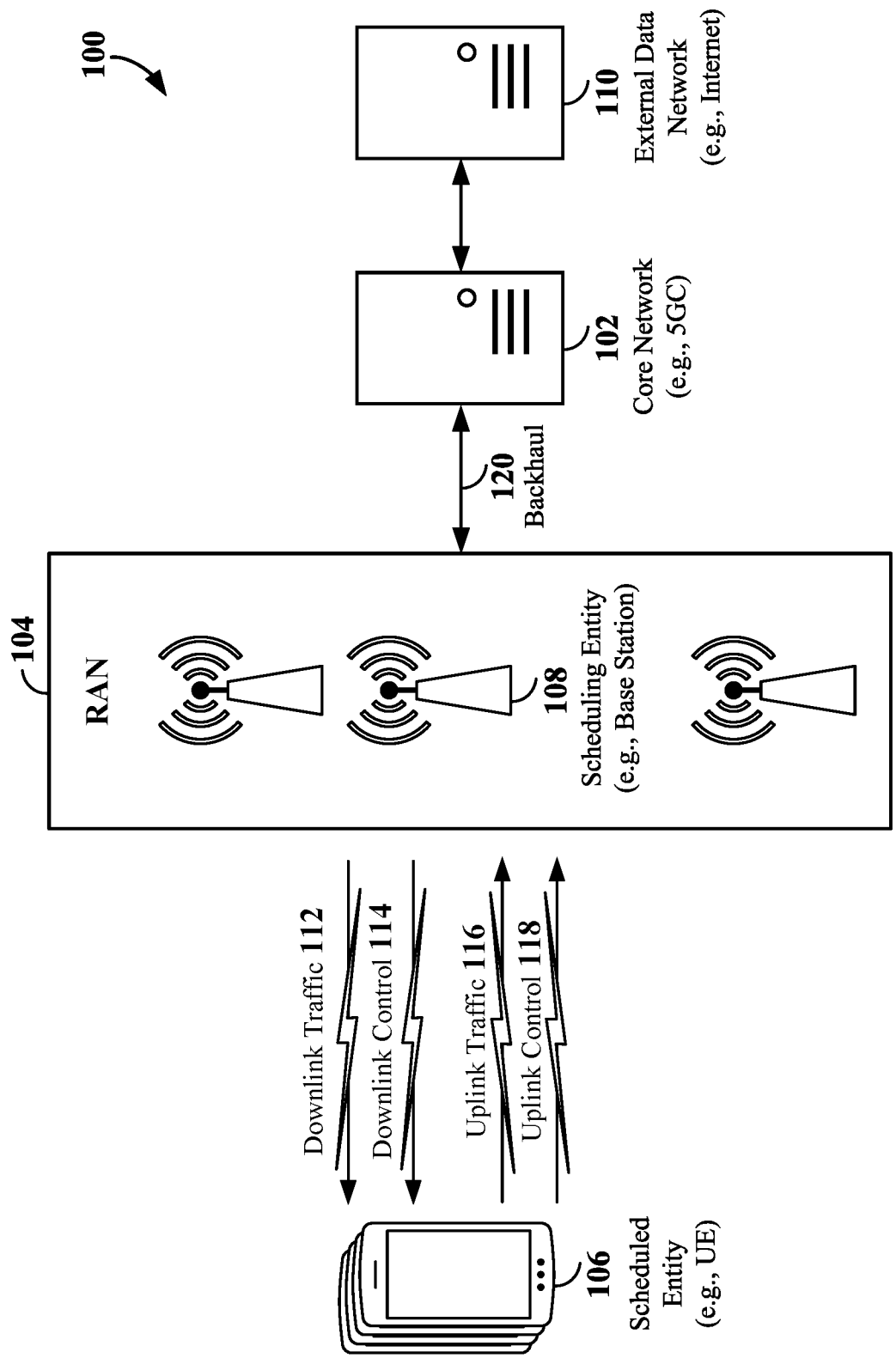
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Physical downlink control channels (PDCCHs) carry downlink control information (DCI) that may be needed for proper assignment and decoding of data channels, such as a physical downlink shared channel (PDSCH). Control channel elements (CCEs) that carry the PDCCH may include demodulation reference signals (DMRSs) that may be used by a UE and a base station to perform channel estimation and adaptation. For example, a CCE may include six resource element groups (REGs). Each REG may include twelve subcarriers of one OFDM symbol. According to some examples, three of the subcarriers of a REG may be used for DMRS while the remaining nine subcarriers may be used for the PDCCH payload. A measured power level of the DMRS may be used for channel estimation and adaptation, but in addition, the measured power level of the DMRS may be predictive of channel quality and reliability. For example, a received DMRS power level that is below a predetermined threshold (e.g., the power level is less than, equal to, or less than or equal to a predetermined value) may be predictive of a PDCCH that cannot offer adequate quality and/or reliability.

In general, PDCCHs may be conveyed over CCEs defined, for example, in a downlink time-frequency resource grid. A UE may not know, ahead of time, how to decode the PDCCH. Accordingly, a base station may establish control resource sets (CORESETs) within the downlink frequency grid. PDCCHs may be scheduled within a CORESET. PDCCHs within a CORESET may be referred to as PDCCH candidates. To add further granularity, a base station may define, and/or a UE may determine, one or more search spaces within each CORESET. The search spaces may be defined by one or more CCEs, which may carry a PDCCH. A PDCCH within a search space may be referred to as a PDCCH candidate. A UE may attempt to decode a PDCCH candidate that may be present in each search space, even if the base station has not scheduled a PDCCH in each search space.

However, the UE may not be configured with, or may not know, all of the parameters that may be needed to decode a PDCCH candidate in a search space. Accordingly, the UE may perform a trial and error process, referred to as a blind decoding process, to try to decode a PDCCH candidate in a search space. The blind decoding process is resource-intensive. There are many combinations of parameters (e.g., CCE start index, aggregation value (i.e., the number of CCEs in a PDCCH), scrambling parameters, etc.) that may be tried before a PDCCH, if present, can be decoded. However, even if successfully decoded, a PDCCH may not be received with sufficient power to convey the DCI, carried by the PDCCH, with acceptable quality and/or reliability levels.

To eliminate PDCCH candidates with insufficient power levels from the blind decoding process, a UE may measure a power level of a DMRS of a PDCCH candidate prior to performing the blind decoding of the PDCCH candidate. According to aspects discussed herein, the UE's measurement of the power level of the DMRS may occur prior to the UE's performance of blind decoding of the PDCCH candidate. If the power level of the DMRS of a given PDCCH candidate is below a predetermined threshold, there may be no need to blind decode that PDCCH candidate, and the UE may forego (e.g., not preform, abandon, skip over) the blind decoding of the given PDCCH candidate. Therefore, the measurement of the power level of the DMRS may be utilized to filter out PDCCH candidates associated with DMRS power levels that may be below a predetermined threshold before beginning a relatively lengthy and resource-intensive process of blind decoding. The testing or filtering of PDCCH candidates using a measurement of a power level of a DMRS, prior to performing blind decoding of the PDCCH candidate associated with the DMRS, may be referred to herein as hybrid blind decoding or DMRS power-level filtered PDCCH blind decoding.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
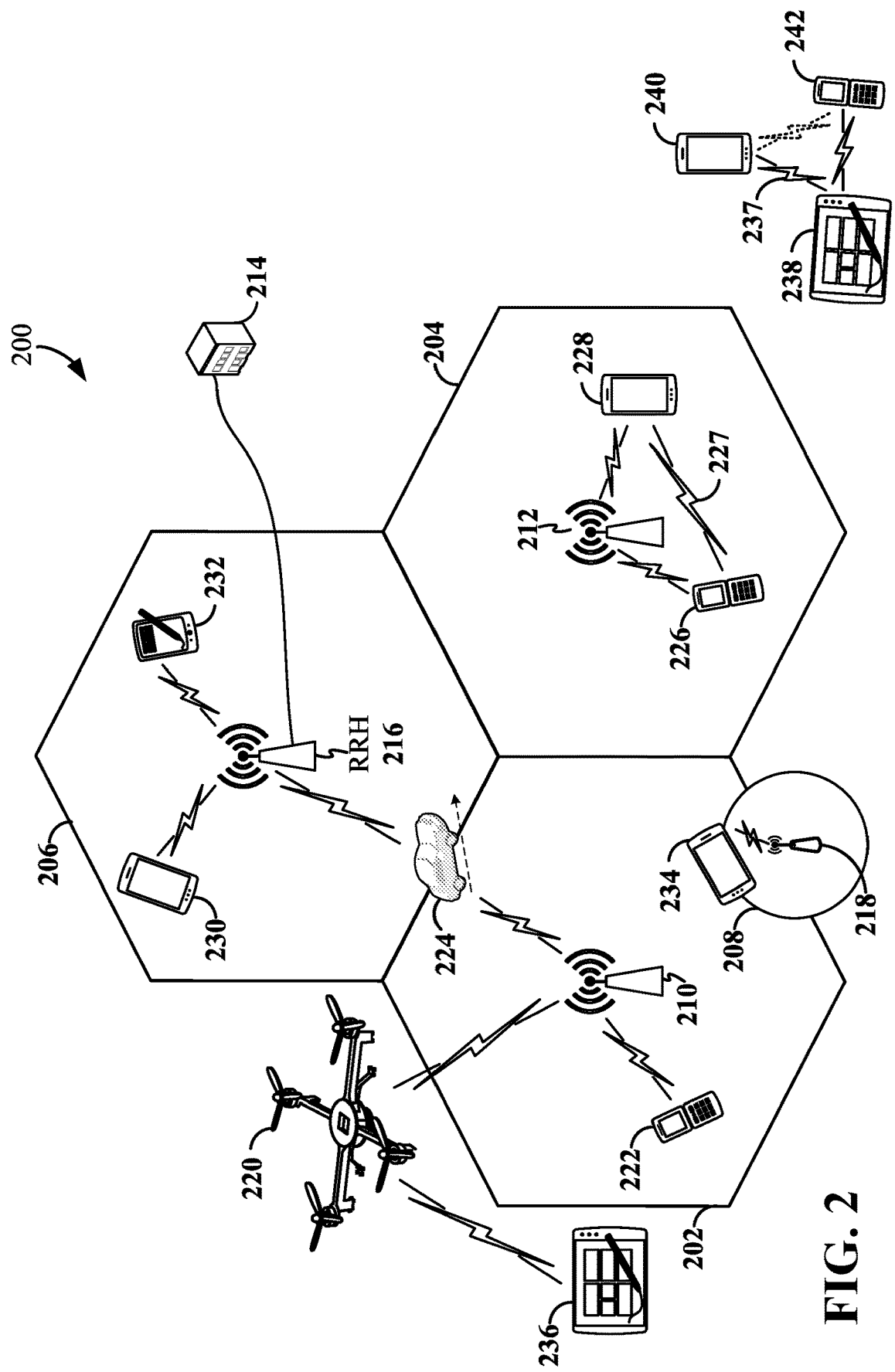
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
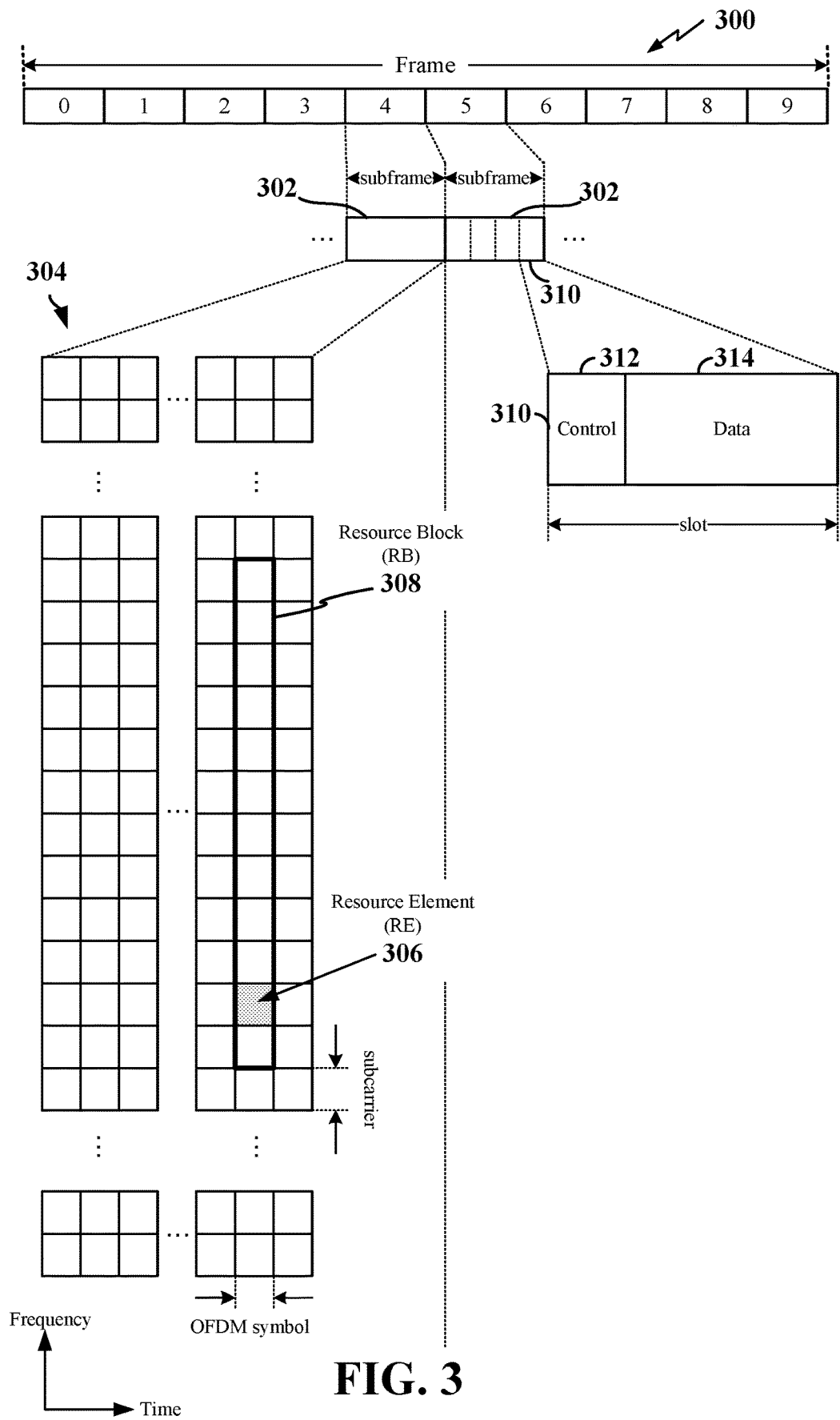
FIG. 3 is a schematic illustration of an organization of wireless resources in an air interface utilizing orthogonal frequency divisional multiplexing (OFDM) according to some aspects of the disclosure.

Referring now to FIG. 3, an expanded view of an exemplary subframe 302 of a frame 300 is illustrated, showing an OFDM resource grid 304. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
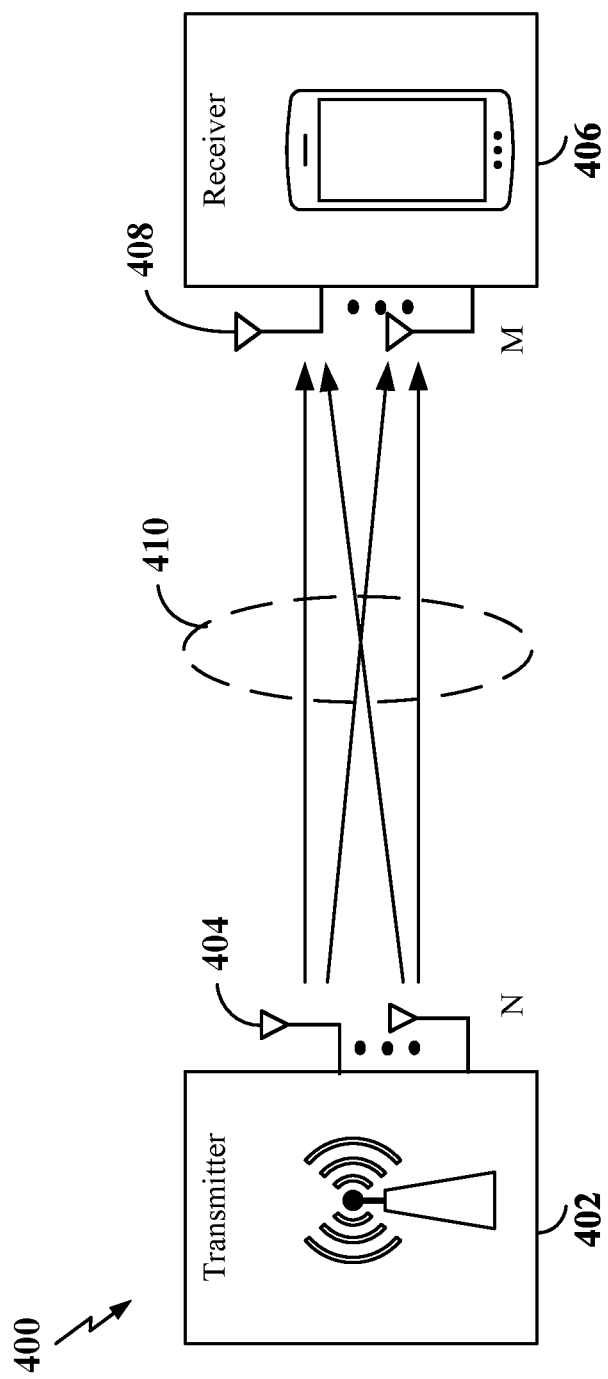
FIG. 4 is a block diagram illustrating a wireless communication system supporting multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. The multiple transmit antennas 404 and multiple receive antennas 408 may each be configured in a single panel or multi-panel antenna array. Each of the transmitter 402 and the receiver 406 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 400 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 400 supporting MIMO) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 4, a rank-2 spatial multiplexing transmission on a 2×2 MIMO antenna configuration will transmit one data stream from each of the transmit antennas 404. Each data stream reaches each of the receive antennas 408 along a different one of the signal paths 410. The receiver 406 may then reconstruct the data streams using the received signals from each of the receive antennas 408.

Beamforming is a signal processing technique that may be used at the transmitter 402 or receiver 406 to shape or steer an antenna beam (e.g., a transmit/receive beam) along a spatial path between the transmitter 402 and the receiver 406. Beamforming may be achieved by combining the signals communicated via antennas 404 or 408 (e.g., antenna elements of an antenna array) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select one or more serving beams for communication with a UE, the base station may transmit a reference signal, such as a synchronization signal block (SSB), a tracking reference signal (TRS), or a channel state information reference signal (CSI-RS), on each of a plurality of beams in a beam-sweeping manner. The UE may measure the reference signal received power (RSRP) on each of the beams and transmit a beam measurement report to the base station indicating the Layer 1 (L-1 RSRP) of each of the measured beams. The base station may then select the serving beam(s) for communication with the UE based on the beam measurement report. In other examples, when the channel is reciprocal, the base station may derive the particular beam(s) to communicate with the UE based on uplink measurements of one or more uplink reference signals, such as a sounding reference signal (SRS).

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub 6 GHz systems.

Figure 5:
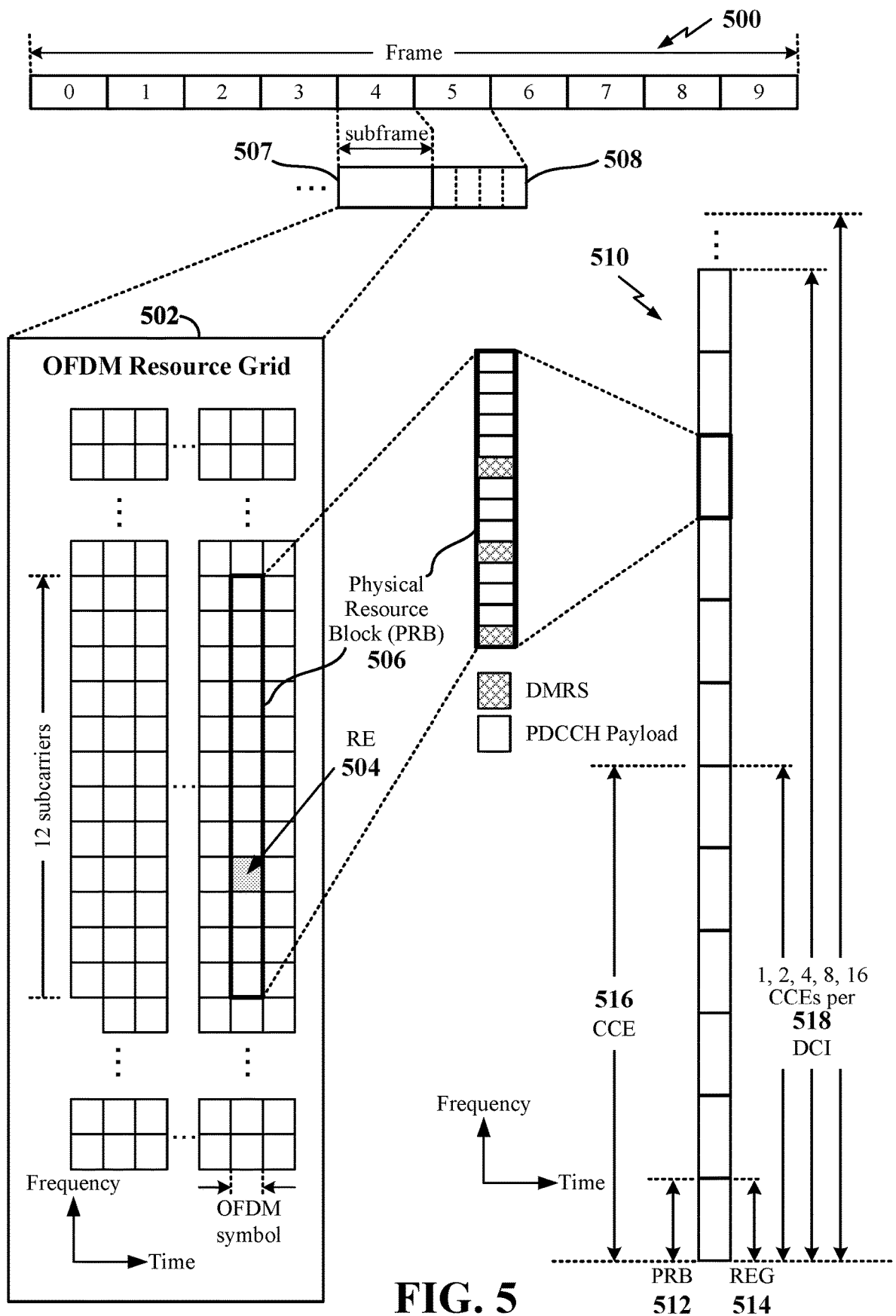
FIG. 5 is a schematic illustration of an organization of wireless resources in an air interface utilizing OFDM and illustrating the location of physical resource blocks within control channel elements (CCEs) and downlink control information (DCI) according to some aspects of the disclosure.

FIG. 5 is a schematic illustration of an organization of wireless resources in an air interface utilizing OFDM and exemplifying a location of a plurality of physical resource blocks (PRBs) within control channel elements (CCEs) and downlink control information (DCI) according to some aspects of the disclosure. In FIG. 5, time is illustrated in the horizontal direction with units of OFDM symbols, and frequency is illustrated in the vertical direction with units of subcarriers or tones. As with FIG. 3, a frame 500 refers to a duration of 10 ms, with each frame 500 consisting of 10 subframes of 1 ms each. An expanded view of an OFDM resource grid 502 depicts an exemplary first subframe 507 with one slot and an exemplary second subframe 508 with four slots.

As with FIG. 3, the resource grid 502 may be used to schematically represent time-frequency resources for a given antenna port. That is, in a multiple-input-multiple-output (MIMO) implementation with multiple antenna ports available, a corresponding multiple number of resource grids 502 may be available for communication. The resource grid 502 is divided into multiple resource elements (REs) 504. An RE 504, which is 1 subcarrier×1 symbol, is the smallest discrete part of the time-frequency grid and contains a single complex value representing data from a physical channel or signal. Depending on the modulation utilized in a particular implementation, each RE may represent one or more bits of information. In the example of FIG. 5, a block of REs may be referred to as a physical resource block (PRB) 506, which contains any suitable number of consecutive subcarriers in the frequency domain. In one example, the PRB 506 may include 12 subcarriers, a number independent of the numerology used. In some examples, depending on the numerology, a PRB may include any suitable number of consecutive OFDM symbols in the time domain. Within the present disclosure, it is assumed that a single PRB such as the PRB 506 entirely corresponds to a single direction of communication (either transmission or reception for a given device).

In the illustrative example shown in FIG. 5, the first subframe 507 includes one slot and the second subframe 508 includes four slots. In FIG. 5, one PRB 506 representing one OFDM symbol of a physical downlink control channel (PDCCH) is depicted in greater detail than other illustrated PRBs for purposes of explanation. The PRB 506 is comprised of 12 subcarriers and one OFDM symbol. Of the 12 subcarriers, 3 are used for demodulation reference signals (DMRSs), and 9 are used for PDCCH payload. The REs 504 carrying the DMRS are the first, fifth, and ninth REs 504 of the PRB 506.

A plurality of PRBs 510, spanning a greater (e.g., wider) bandwidth than PRB 506 alone, are depicted in FIG. 5. For example, the plurality of PRBs 510 includes PRB 506 and a second PRB 512. One PRB, such as the second PRB 512, may be referred to as a resource element group (REG). As illustrated, the second PRB 512 corresponds to a REG 514. According to some aspects, a control channel element (CCE) 516 may include 6 REGs. A CCE 516 may be a smallest unit of a scheduled PDCCH transmission. According to some examples, a collection of 1, 2, 4, 8, or 16 CCEs (such as CCE 516) (where the number 1, 2, 4, 8, or 16, may be referred to as the aggregation level) may be referred to as downlink control information (DCI) 518. The CCE may be the unit upon which search spaces for blind decoding of PDCCH candidates are defined. In the example of FIG. 5, the DCI 518 may carry control information used to schedule a user data channel (e.g., the PDSCH) on the downlink, for example. In the example of FIG. 5, the DCI 518 may be carried by the PDCCH.

Figure 6:
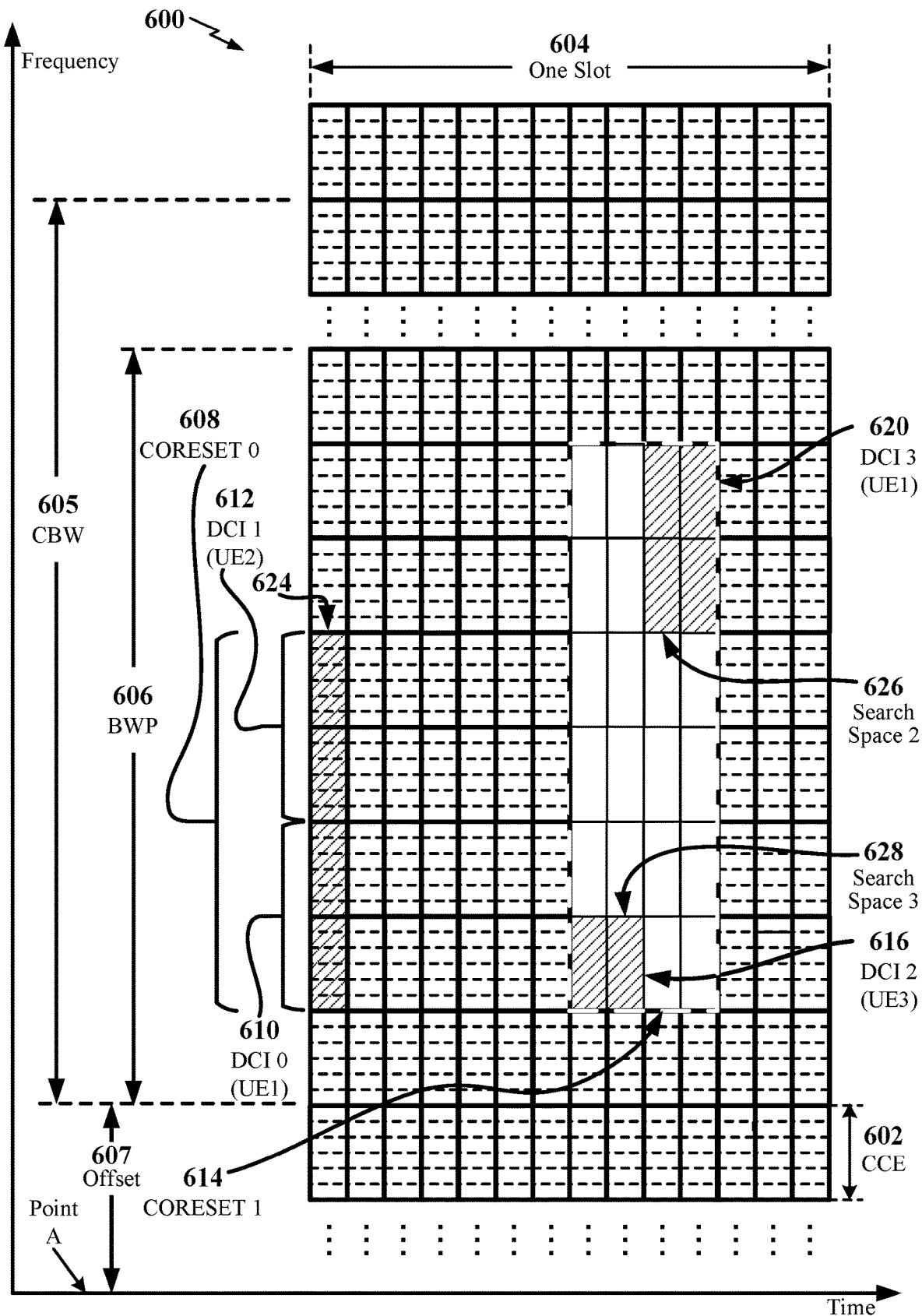
FIG. 6 is a schematic illustration of an organization of wireless resources in an air interface utilizing OFDM according to some aspects of the disclosure.

FIG. 6 is a schematic illustration of an organization of wireless resources in an air interface utilizing OFDM according to some aspects of the disclosure. In FIG. 6, time is illustrated in the horizontal direction with units of OFDM symbols, and frequency is illustrated in the vertical direction with units of CCEs. For example, the vertical dimension of each major solid line rectangle represents one CCE 602. Each CCE 602 in the example of FIG. 6 includes 6 resource element groups (REGs). Each REG includes one physical resource block (PRB) of 12 subcarriers by one OFDM symbol. The 6 REGs are each represented by a minor dashed line rectangle. One slot 604 (e.g., 14 OFDM symbols) in the time domain is illustrated. The time-frequency resources of FIG. 6 are depicted in a downlink resource grid 600.

FIG. 6 depicts one bandwidth part (BWP) 606 within a carrier bandwidth (CBW) 605. According to some aspects, a BWP 606 is a contiguous set of physical resource blocks (PRBs) on a given carrier. In FIG. 6, one contiguous set of PRBs are represented by the contiguous sets of CCEs 602 in the BWP 606. The BWP 606 may be offset 607 in frequency from a common reference point for all resource grids in the frequency domain. The common reference point may be referred to as "Point A." An example of a Point A is illustrated in FIG. 6. Point A may be a center of subcarrier 0 of a common resource block 0 of a lowest resource grid. Point A may be outside of a carrier BW assigned to or used by a particular device. In the example of FIG. 6, the BWP 606 corresponds to a set of 48 PRB (i.e., 8 CCEs×6 PRBs/CCE), which represent 576 subcarriers (i.e., 12 REs/REG×6 REGs/CCE×8 CCE). A scheduling entity (e.g., a base station, an eNB, a gNB) may define common CCEs and scheduled entity-specific (e.g., UE-specific) CCEs.

In FIG. 6, for example, CORESET 0 608 includes 24 REGs (corresponding to 24 PRBs) in one set of four CCEs (where each CCE may be similar to CCE 602), configured as four CCEs in the frequency domain and one OFDM symbol in the time domain. The four CCEs may be grouped as a first DCI (DCI 0 610) and a second DCI (DCI 1 612). There are two CCEs in DCI 0 610 and two CCEs in DCI 1 612. Within CORESET 0 608, DCI 0 610 may be associated with a first scheduled entity (e.g., a first UE, UE1), and DCI 1 612 may be associated with a second scheduled entity (e.g., a second UE, UE2).

In another example, CORESET 1 614 includes two CCEs, grouped as a third DCI (DCI 2 616) and four DCIs grouped as a fourth DCI (DCI 3 620). DCI 2 616 may be configured as one CCE in the frequency domain and 2 OFDM symbols in the time domain. DCI 2 616 may be associated with a third scheduled entity (e.g., a third UE, UE3). DCI 3 620 may be configured as two CCEs in the frequency domain and 2 OFDM symbols in the time domain. DCI 3 620 may be associated with the first scheduled entity (e.g., the first UE, UE1).

Three search spaces are identified in the downlink resource grid 600. A first search space 624 may be in CORESET 0 608 and may be coincident with an outline of DCI 0 610 and DCI 1 612. A second search space 626 and a third search space 628 may be in CORESET 1 614. The second search space 626 may be coincident with the outline of DCI 3 620. The third search space 628 may be coincident with the outline of DCI 2 616.

A search space may include several PDCCH candidates. There may be a mapping between a CORESET and a search space. For example, a CORESET may include a plurality of search spaces. In general, the scheduled entity may attempt to blind decode a PDCCH candidate in each search space, even if a scheduling entity did not schedule a PDCCH in any given search space. A CORESET may be associated with a common search space, a scheduled entity-specific search space, or a combination of both.

The following relationships between CORESETs, BWPs, and search spaces are made with reference to NR; however, the following is exemplary and non-limiting and other relationships between CORESETs, BWPs, and search spaces (or their equivalents, for example in other radio technologies) are within the scope of the disclosure. In general, there may be up to three CORESETs per BWP, including both common and scheduled entity-specific CORESETs. There may be up to four BWPs per serving cell, with only one of the BWPs active at a given time. Accordingly, a maximum number of CORESETs per serving cell may be twelve (e.g., 3 CORESETs per BWP×4 BWPs per serving cell). The resource elements of a CORESET may be mapped to one or more CCEs. One or more CCEs from one CORESET may be aggregated to form the resources used by one PDCCH. Blind decoding of PDCCH candidates may be based on search spaces. A maximum number of search spaces per BWP may be ten. Multiple search spaces may use the time-frequency resources of one CORESET.

According to one example, a scheduling entity may compute a cyclic redundancy check (CRC) of a payload of a DCI carried by a PDCCH. The CRC may be scrambled using a scheduled entity identifier. An example of such an identifier may be a cell-radio network temporary identifier (C-RNTI). Upon receipt of the DCI, the scheduled entity may compute a scrambled CRC of the payload of the DCI using the same procedure as used by the scheduling entity. The scheduled entity may then compare the scrambled CRC to the received CRC. If the CRCs are equal, the DCI was meant for the scheduled entity. If the payload was corrupted or the CRC was scrambled using another scheduled entity's identification, then the CRCs would not match, and the scheduled entity may disregard the DCI.

Just as the CRC of a given PDCCH candidate may be used to determine if the PDCCH candidate is associated with a given scheduled entity identifier (e.g., a C-RNTI), the CRC (or some other aspect correlating a scheduled entity to a PDCCH candidate) may be used to associate a demodulation reference signal (DMRS) power level of a given PDCCH candidate with a given scheduled entity. Accordingly, a DMRS power level of a PDCCH candidate may be evaluated prior to blind decoding of the PDCCH candidate. If the DMRS power level of a given PDCCH candidate of a given scheduled entity is below a predetermined threshold, there may be no need to blind decode the given PDCCH candidate. Therefore, the measurement of the power level of the DMRS may be utilized to test or filter PDCCH candidates associated with unacceptable DMRS power levels before beginning a relatively lengthy process of blind decoding. The testing or filtering of PDCCH candidates using a measurement of a power level of a DMRS prior to performing blind decoding of the PDCCH candidate may be referred to herein as hybrid blind decoding.

In instances where the DMRS power level of a given PDCCH candidate is below the predetermined threshold, foregoing (e.g., not performing, abandoning performance of, skipping over performance of) the blind decoding of the given PDCCH candidate may have a beneficial effect on the monitoring of one or more other PDCCH candidates in the same search space or another search space. The beneficial effect may be realized by foregoing the counting of the PDCCH candidate having the below the predetermined threshold DMRS power level (e.g., the PDCCH candidate that does not satisfy, or fails to satisfy, the predetermined threshold DMRS power) against a maximum number of PDCCH candidate blind decodes allowed for a given scheduled entity. Accordingly, dropping rules, for example including rules relating to foregoing (e.g., not performing, abandoning, and/or skipping over) a performance of blind decoding of the PDCCH candidate having the below the predetermined threshold DMRS power may provide a positive effect in connection with counting blind decodes against limits on a total number of blind decodes performed by a scheduled entity.

For example, a scheduled entity may be allotted (e.g., configured with) a maximum number of PDCCH candidate blind decodes. By foregoing (e.g., not conducting) a PDCCH candidate blind decode on a PDCCH candidate with inadequate DMRS power level, the scheduled entity may reserve its resources to conduct blind decodes on other PDCCH candidates that may have adequate DMRS power levels. Accordingly, instituting dropping rules (e.g., including rules relating to foregoing or dropping performance of blind decoding of the PDCCH candidate) may allow a scheduled entity to avoid spending resources on blind decoding of possibly inadequate PDCCH candidates; therefore, instituting dropping rules may improve the overall performance of the scheduled entity. Such dropping rules may allow the scheduled entity to expend its limited number of blind decodes on PDCCH candidates with adequate DMRS power levels. According to one aspect, implementation of a dropping rule that permits foregoing the performance of blind decoding of PDCCH candidates having measured DMRSs that are below a predetermined threshold, may remove the CCEs associated with that PDCCH candidate from consideration of the maximum number of CCEs allowable or allotted for blind decoding. It may therefore make room for blind decoding of other PDCCH candidates.

According to another example, from a perspective of a base station, if the base station foregoes scheduling a PDCCH candidate in a given search space, then a scheduled entity may forego counting the CCEs of the given search space against a number (e.g., a quantity, a configured maximum number or quantity) of CCEs that are permitted for blind decoding.

According to still another aspect, a base station may configure one or more scheduled entities to either utilize (e.g., activate, employ) hybrid blind decoding or forego utilization of (e.g., deactivate, stop the employment of) hybrid blind decoding. As used herein, hybrid blind decoding may refer to the measurement of a power level of a DMRS, prior to blind decoding of a PDCCH candidate corresponding to or associates with the DMRS, and comparison of the measured power level of the DMRS to a predetermined threshold. Hybrid blind decoding may be used to filter out inadequate PDCCH candidates from the blind decoding process. The base station may dynamically utilize or forego hybrid blind decoding based on a scheduled entity-specific configuration or a group-common configuration. The configuring, activating, or deactivating may be performed dynamically. For example, the configuring, activating, or deactivating may be indicated to the scheduled entity via a scheduled entity-specific or group-common DCI or medium access control-control element (MAC-CE) and/or during configuration of a search space, for example.

According to another aspect, a base station may configure a scheduled entity to utilize hybrid blind decoding on a subset of PDCCH candidates. The subset of PDCCH candidates may be located in one search space. In general, and in non-limiting summary, the base station may dynamically configure (e.g., use or not-use, activate or deactivate) hybrid blind decoding in scheduled entity-specific or group-common downlink control information (DCI), medium access control-control element (MAC-CE), radio resource control (RRC) signaling, or other control plane signaling, for example. In some examples, the scheduled entity may be preconfigured (e.g., via a configuration stored in a memory of the scheduled entity) to utilize hybrid blind decoding under all circumstances or under certain predefined circumstances.

Parameters related to PDCCH blind decoding (e.g., non-hybrid blind decoding) and hybrid blind decoding as described herein (e.g., DMRS power-level filtered PDCCH blind decoding) may be defined in one or more wireless communication specifications. The parameters may be obtained by a scheduled entity, for example, from a scheduling entity (e.g., a base station or a wireless communication network node). In one example, a scheduling entity may configure a scheduled entity with a maximum number of blind decodings (e.g., the value "C" shown below). For example, a limit may be defined on a total number of CCEs covered by PDCCH candidates operated upon using the two procedures of non-hybrid blind decoding and hybrid blind decoding, where different weights may be applied to the two procedures. By way of example and not limitation, an algebraic rule to establish a maximum number of CCEs may be expressed as $nA+mB<C$, where "A" (e.g., a first number) may be the number of CCEs covered by non-hybrid blind decoding, n may be a first multiplier used to weight A, "B" may be the number of CCEs covered by hybrid blind decoding (e.g., a second number), m may be a second multiplier used to weight B, and C may be a maximum number of CCEs. In one example, the first number and/or the second number may be determined on at least one of: a per slot basis, or a per group of consecutive slots basis. The variables n, A, m, B, and C may all be positive integers. According to one example, n may be greater than m. In one non-limiting example, $n=4$, $m=1$, and $C=400$.

Additionally, blind decoding limits may be defined on a per slot basis (e.g., defined for each slot) and/or on a group basis. For example, a first blind decoding limit may be applied to each slot and/or a second blind decoding limit may be applied to groups of consecutive slots (e.g., where the periodicity of the second blind decoding limit may be given as groups of every r consecutive slots, or where the periodicity of the second blind decoding limit may be given as groups of every rth slot, where for example, $r=4$). According to some aspects, blind decoding limits may depend on subcarrier spacing. According to still other aspects, the applicability of hybrid blind decoding may depend on, for example, the number of CCEs of a given PDCCH candidate, the number of OFDM symbols of a given CORESET or a given virtual CORESET, the subcarrier spacing, the frequency or frequency range of a BWP or carrier, or any combination of them.

Providing a scheduled entity and scheduling entity with an option of employing hybrid blind decoding (e.g., measurement of a power level of a DMRS and evaluation of the measured power level to a predetermined threshold prior to PDCCH candidate blind decoding) as exemplified herein may enable a scheduled entity to save resources that would otherwise be expended on a process of blind decoding PDCCH candidates with possibly less than adequate DMRS power levels, where a less than adequate DMRS power level (e.g., a power level that is below a predetermined threshold, a power level that is below the predetermined threshold) may be an indicator of a channel with less than adequate quality and/or reliability.

Figure 7:
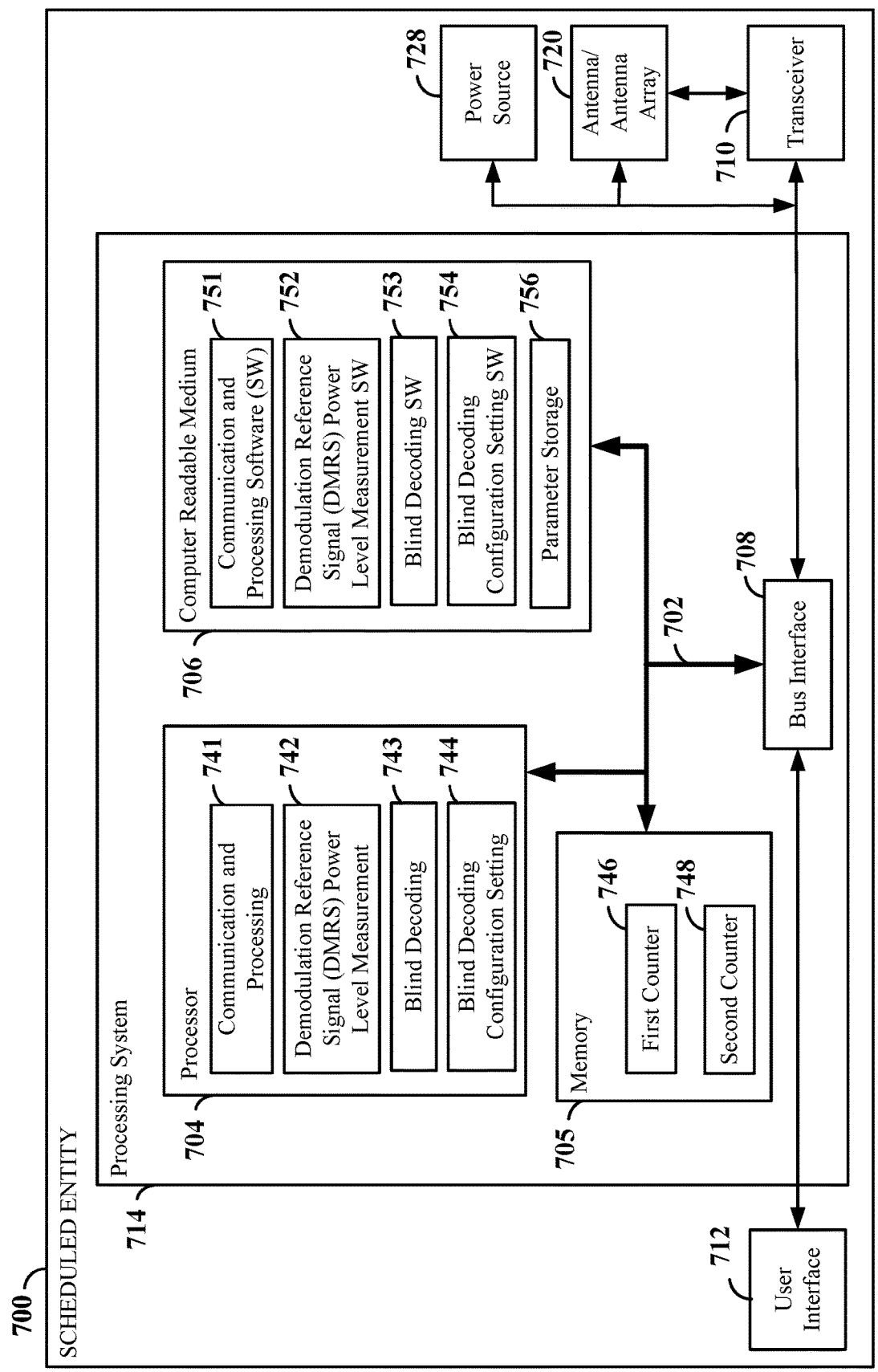
FIG. 7 is a block diagram illustrating an example of a hardware implementation of a scheduled entity employing a processing system according to some aspects of the disclosure.

FIG. 7 is a block diagram illustrating an example of a hardware implementation for a scheduled entity 700 employing a processing system 714 according to some aspects of the disclosure. For example, the scheduled entity 700 may be a user equipment (UE) as illustrated in any one or more of FIG. 1, FIG. 2, and/or FIG. 4.

In accordance with various aspects of the disclosure, an element, or any portion of an element, or any combination of elements may be implemented with a processing system

714 that includes one or more processors, such as processor 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 700 may be configured to perform any one or more of the functions described herein. That is, the processor 704, as utilized in a scheduled entity 700, may be used to implement any one or more of the methods or processes described and illustrated, for example, in FIG. 8 and/or FIG. 9.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further.

A bus interface 708 provides an interface between the bus 702 and a transceiver 710. The transceiver 710 may be a wireless transceiver. The transceiver 710 provides a means for communicating with various other apparatus over a transmission medium (e.g., air interface). The transceiver 710 may further be coupled to one or more antennas or antenna arrays 720. The bus interface 708 further provides an interface between the bus 702 and a user interface 712 (e.g., keypad, display, touch screen, speaker, microphone, control features, etc.). In addition, the bus interface 708 further provides an interface between the bus 702 and a power source 728.

One or more processors, such as processor 704, may be responsible for managing the bus 702 and general processing, including the execution of software stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 706 (e.g., on a non-transitory processor-readable storage medium). The software, when executed by the processor 704, may cause the processing system 714 to perform the various processes and functions described herein for any particular apparatus. In other words, instructions stored on a non-transitory processor-readable storage medium which, when executed by a processing circuit, may cause the processing circuit to perform the various processes and functions described herein for any particular apparatus.

The computer-readable medium 706 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be, or may be included in, a computer program product or article of manufacture. By way of example, a computer program product or article of manufacture may include a computer-readable medium in packaging materials. In some examples, the computer-readable medium 706 may be part of the memory 705. Those skilled in the art will recognize how best to implement the described functionality presented throughout this disclosure depending on the particular application and the overall design constraints imposed on the overall system. The computer-readable medium 706 and/or the memory 705 may also be used for storing data that is manipulated by the processor 704 when executing software. For example, the memory 705 may store a value of a first counter 746 of a first number of blind decodes performed on a first subset of a plurality of PDCCH candidates that did not have measurements of power levels of DMRSs prior to blind decoding. The memory 705 may further store a value of a second counter 745 of a second number of blind decodes performed on a second subset of the plurality of PDCCH candidates that have measurements of power levels of DMRSs that are above the predetermined threshold (measured) prior to blind decoding.

In some aspects of the disclosure, the processor 704 may include communication and processing circuitry 741 configured for various functions, including for example communicating with a scheduling entity, the network core (e.g., a 5G core network), other scheduled entities, or any other entity, such as, for example, local infrastructure or an entity communicating with the scheduled entity 700 via the Internet, such as a network provider. The communication and processing circuitry 741 may further be configured, for example, for receiving a blind decoding configuration setting, and enabling, in response to the blind decoding configuration setting, measurements of power levels of respective demodulation reference signals (DMRSs) prior to blind decoding of respective physical downlink control channel (PDCCH) candidates associated with the respective DMRSs. The blind decoding configuration setting may be determined based on at least one of: a number of control channel elements (CCEs) of the respective PDCCH candidate, a first number of orthogonal frequency division multiplex (OFDM) symbols of a control resource set (CORESET) associated with the first respective PDCCH candidate, a second number of OFDM symbols of a virtual CORESET associated with the respective PDCCH candidate, subcarrier spacing, or frequency range containing a bandwidth part carrying the respective PDCCH candidate. In some examples, the blind decoding configuration setting may identify a subset of PDCCH candidates to which measurements of the power levels of the respective DMRSs, prior to blind decoding, apply. The subset of PDCCH candidates may be included in one search space. In some examples, the blind decoding configuration setting may enable measurement of a power level of a first DMRS of a first PDCCH candidate prior to performing blind decoding of the first PDCCH candidate. The blind decoding configuration setting may either enable (e.g., activate) or disable (e.g., deactivate) the measurement of the power level of the first DMRS of the first PDCCH candidate prior to performing blind decoding of the first PDCCH candidate.

In some examples, the communication and processing circuitry 741 may include one or more hardware components that provide the physical structure that performs processes related to wireless communication (e.g., signal reception and/or signal transmission) and signal processing (e.g., processing a received signal and/or processing a signal for transmission). The communication and processing circuitry 741 may include one or more hardware components that provide the physical structure that performs processes related to, for example, receiving the blind decoding configuration setting, and enabling, in response to the blind decoding configuration setting, measurements of power levels of respective DMRSs prior to performing blind decoding of respective PDCCH candidates associated with the respective DMRSs. The communication and processing circuitry 741 may include one or more hardware components that provide the physical structure that performs processes related to, for example, receiving the blind decoding configuration setting and enabling measurements of power levels of respective DMRSs prior to performing blind decoding of respective PDCCH candidates associated with the respective DMRSs. In addition, the communication and processing circuitry 741 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 741 may further be configured to execute communication and processing software 751 stored on the computer-readable medium 706 to implement one or more functions described herein.

In some aspects of the disclosure, the processor 704 may include demodulation reference signal (DMRS) power level measurement circuitry 742 configured for various functions, including, for example, measuring a power level of a respective demodulation reference signal (DMRS) prior to a blind decoding of a respective physical downlink control channel (PDCCH) candidate associated with the respective DMRS. In some examples, the DMRS power level measurement circuitry 742 may be configured for additional functions, including, for example, measuring a next power level of a next respective DMRS associated with a next respective PDCCH candidate. In some examples, if the respective PDCCH candidate is in a first search space, the DMRS power level measurement circuitry 742 may also be configured to measure a second power level of a second DMRS associated with a second PDCCH candidate in a second search space, different from the first search space. In some examples, the DMRS power level measurement circuitry 742 may include one or more hardware components that provide the physical structure that performs processes related to performing the measuring of the power level of the respective DMRS prior to the blind decoding of the respective PDCCH candidate associated with the respective DMRS, the measuring of the next power level of the next respective DMRS, and/or measuring the second power level of the second DMRS associated with the second PDCCH candidate in the second search space, different from the first search space. The DMRS power level measurement circuitry 742 may further be configured to execute DMRS power level measurement software 752 stored on the computer-readable medium 706 to implement one or more functions described herein.

In some aspects of the disclosure, the processor 704 may include blind decoding circuitry 743 configured for various functions, including, for example, at least one of: performing the blind decoding of the respective PDCCH candidate if the power level of the respective DMRS is above a predetermined threshold, or foregoing (e.g., not performing, abandoning a performance of, skipping over the performance of) the blind decoding of the respective PDCCH candidate if the power level of the respective DMRS is below the predetermined threshold. In some examples, the blind decoding circuitry 743 may be configured for additional functions, including, for example, performing a next blind decoding of a next respective PDCCH candidate if a next power level of the next respective DMRS is above the predetermined threshold (where, for example, the performing occurs after the DMRS power level measurement circuitry 742 measures the next power level of the next respective DMRS associated with the next respective PDCCH candidate). In some examples, the blind decoding circuitry 743 may additionally be configured for a function of incrementing the count of the counter that records the total number of blind decodes of PDCCH candidates only if the power level of the respective DMRS is above the predetermined threshold. The respective PDCCH candidate may be in a first search space and, following the foregoing of the blind decoding of the respective PDCCH candidate, the blind decoding circuitry 743 may be configured for still other functions, including, for example, measuring a second power level of a second DMRS associated with a second PDCCH candidate in a second search space, different from the first search space.

In some examples, the blind decoding circuitry 743 may include one or more hardware components that provide the physical structure that performs processes related to the performing of the blind decoding of the respective PDCCH candidate if the power level of the respective DMRS is above a predetermined threshold, or foregoing the blind decoding of the respective PDCCH candidate if the power level of the respective DMRS is below the predetermined threshold. The one or more hardware components may additionally provide the physical structure that performs processes related to incrementing a count of a counter that records a total number of blind decodes of PDCCH candidates only if the power level of the respective DMRS is above the predetermined threshold, or measuring a next power level of a next respective DMRS associated with a next respective PDCCH candidate, and performing a next blind decoding of the next respective PDCCH candidate if the next power level of the next respective DMRS is above the predetermined threshold and/or measuring the second power level of the second DMRS associated with the second PDCCH candidate in the second search space, different from the first search space. The blind decoding circuitry 743 may further be configured to execute blind decoding software 753 stored on the computer-readable medium 706 to implement one or more functions described herein.

In some aspects of the disclosure, the processor 704 may include blind decoding configuration setting circuitry 744 configured for various functions, including, for example, receiving a blind decoding configuration setting, and enabling, in response to the blind decoding configuration setting, the measuring of the power level of the respective DMRS prior to the blind decoding of the respective PDCCH candidate. In some examples, the blind decoding configuration setting circuitry 744 may include one or more hardware components that provide the physical structure that performs processes related to performing the receiving of the blind decoding configuration setting, and the enabling, in response to the blind decoding configuration setting, of the measuring of the power level of the respective DMRS prior to the blind decoding of the respective PDCCH candidate. In some examples, the blind decoding configuration setting may be determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CORESET associated with the respective PDCCH candidate, subcarrier spacing, or a frequency range containing a bandwidth part carrying the respective PDCCH candidate. In some examples, the blind decoding configuration setting may identify a subset of PDCCH candidates to which measurements of power levels of DMRSs apply. The subset of PDCCH candidates may be included in one search space. The blind decoding configuration setting circuitry 744 may further be configured to execute blind decoding configuration setting software 755 stored on the computer-readable medium 706 to implement one or more functions described herein.

In some aspects of the disclosure, the computer-readable medium 706 may have space reserved for parameter storage 756. The parameter storage 756 may include one or more values that represent, for example, a first value representative of a number of CCEs (e.g., a quantity of CCEs) covered by non-hybrid blind decoding (e.g., the first value, "A"), a first multiplier used to weight the first value (e.g., a value "n" that may be used to weight the first value "A"), a second value representative of a number of CCEs covered by hybrid blind decoding (e.g., the second value "B"), a second multiplier used to weight the second value (e.g., a value "m" that may be used to weight the second value "B"), and a third value that represents a maximum number of CCEs or a maximum number of blind decodes (e.g., the third value "C").

Figure 8:
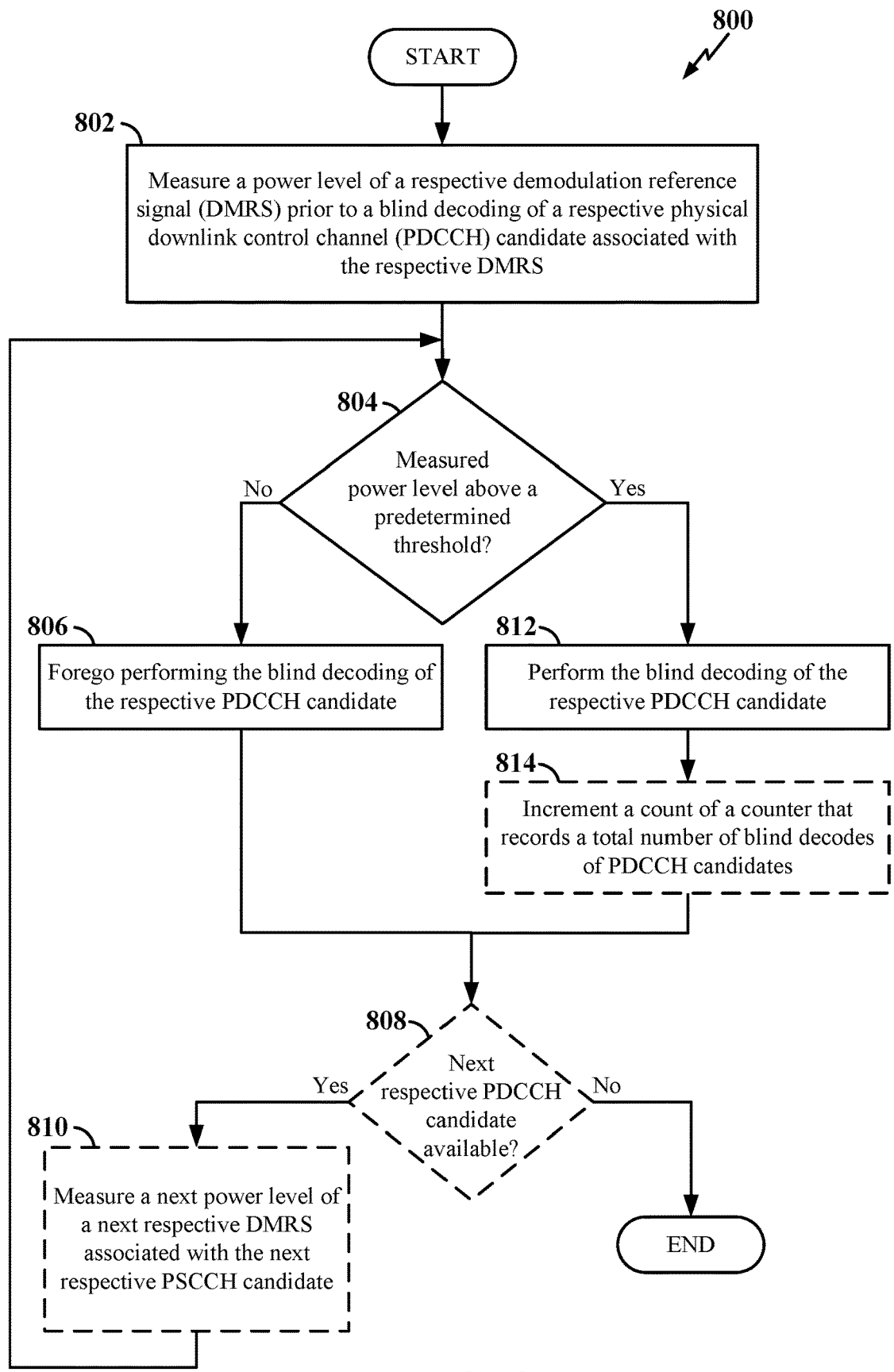
FIG. 8 is a flow chart illustrating an exemplary process of wireless communication at a scheduled entity according to some aspects of the disclosure.

FIG. 8 is a flow chart illustrating an exemplary process 800 (e.g., a method) of wireless communication at a scheduled entity (e.g., a UE) in accordance with some aspects of the disclosure. As described below, some or all illustrated features may be omitted in a particular implementation within the scope of the present disclosure, and some illustrated features may not be required for implementation of all examples. In some examples, the process 800 may be carried out by the scheduled entity 700 illustrated in FIG. 7. In some examples, the process 800 may be carried out by any suitable apparatus or means for carrying out the functions or algorithms described herein.

At block 802, the scheduled entity may measure a power level of a respective demodulation reference signal (DMRS) prior to a blind decoding of a respective physical downlink control channel (PDCCH) candidate associated with the respective DMRS. For example, the DMRS power level measurement circuitry 742 shown and described above in connection with FIG. 7 may provide a means to measure the power level of the respective DMRS prior to the blind decoding of the respective PDCCH candidate associated with the respective DMRS.

At block 804, a determination may be made about whether the measured power level is above a predetermined threshold. Persons of skill may recognize that a measured power level that is above a predetermined threshold may be considered a power level that satisfies the predetermined threshold. Conversely, a measured power level that is below the predetermined threshold may be considered a power level that does not satisfy the predetermined threshold. Furthermore, those of skill may determine, on a case-by-case or application-by-application basis whether a measured power level that is equal to the predetermined threshold may be considered a power level that satisfies or does not satisfy the predetermined threshold. If, at block 804, it is determined that the measured power level is below the predetermined threshold, the scheduled entity may, at block 806, forego performing (e.g., not perform, abandon performance of, skip over the performance of) the blind decoding of the respective PDCCH candidate if the power level of the respective DMRS is below the predetermined threshold. In some examples, the communication and processing circuitry 741 and/or the DMRS power level measurement circuitry 742, shown and described above in connection with FIG. 7, may provide a means to forego performing the blind decoding of the respective PDCCH candidate.

At block 808, the scheduled entity may (optionally) determine if a next respective PDCCH candidate is available. For example, the communication and processing circuitry 741, shown and described above in connection with FIG. 7, may provide a means to determine if a next respective PDCCH candidate is available. If at block 808 it is determined that a next respective PDCCH candidate is available, the process may advance to block 810.

At block 810, the scheduled entity may (optionally) measure a next power level of a next respective DMRS associated with a next respective PDCCH candidate (prior to performing a next blind decoding of the next respective PDCCH candidate if the next power level of the next respective DMRS is above the predetermined threshold). For example, the DMRS power level measurement circuitry 742 shown and described above in connection with FIG. 7 may provide a means to measure the power level of the next respective DMRS associated with a next respective PDCCH candidate. The process may then return to block 804 where the scheduled entity may determine if the next power level of the next respective DMRS is above the predetermined threshold. The scheduled entity may perform a next blind decoding of the next respective PDCCH candidate if the next power level of the next respective DMRS is above the predetermined threshold as described in connection with block 812.

Returning to block 804, if the scheduled entity determines that the measured power level of the respective DMRS (or the measured next power level of the next respective DMRS) is above the predetermined threshold, the scheduled entity may, at block 812, perform the blind decoding of the respective PDCCH candidate associated with the respective DMRS (or the next respective PDCCH candidate associated with the next respective DMRS). For example, the blind decoding circuitry 743 shown and described above in connection with FIG. 7 may provide a means to perform the blind decoding of the respective PDCCH candidate associated with the respective DMRS (or the next respective PDCCH candidate associated with the next respective DMRS).

Next, at block 814, the scheduled entity may (optionally) increment a count of a counter that records a total number of blind decodes of PDCCH candidates only if the power level of the respective DMRS (and/or the next respective DMRS) is above the predetermined threshold. For example, the communications and processing circuitry 741 may provide a means to increment the count of the counter that records the total number of blind decodes of PDCCH candidates only if the power level of the respective DMRS (and/or the next respective DMRS) is above the predetermined threshold. Examples of the counter may include, without limitations, first counter 746 and/or second counter 748 in memory 705 as shown and described above in connection with FIG. 7. Thereafter, the process may return to block 808.

If, at block 808, the scheduled entity determines that a next respective PDCCH candidate is available, then the process may continue to block 810 as previously described. If, however, at block 808, the scheduled entity determines that a next respective PDCCH candidate is unavailable (e.g., not available, does not exist at the time), the process may end.

Figure 9:
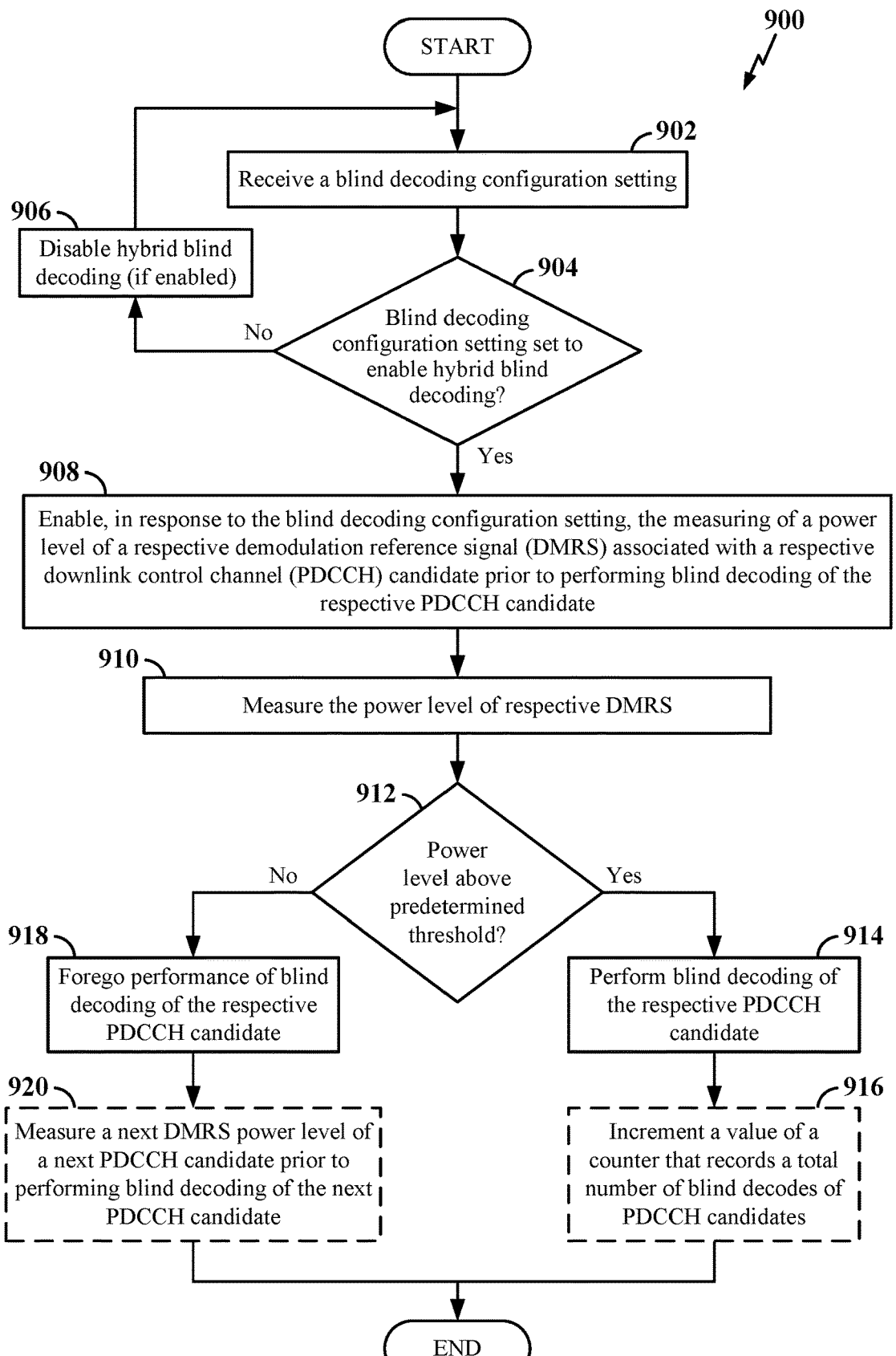
FIG. 9 is a flow chart illustrating an exemplary process of wireless communication at a scheduled entity according to some aspects of the disclosure.

FIG. 9 is a flow chart illustrating an exemplary process 900 (e.g., a method) of wireless communication at a scheduled entity (e.g., a UE) in accordance with some aspects of the disclosure. As described below, some or all illustrated features may be omitted in a particular implementation within the scope of the present disclosure, and some illustrated features may not be required for implementation of all examples. In some examples, the process 900 may be carried out by the scheduled entity 700 illustrated in FIG. 7. In some examples, the process 900 may be carried out by any suitable apparatus or means for carrying out the functions or algorithms described herein.

At block 902, the scheduled entity may receive a blind decoding configuration setting. According to some aspects, the blind decoding configuration setting may be received from a scheduling entity (e.g., a base station, a gNB, a network access node). The blind decoding configuration setting may be, for example, a semi-persistent setting or a MAC-CE, for example. In some examples, the blind decoding configuration setting may be determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CORESET associated with the respective PDCCH candidate, subcarrier spacing, or a frequency range containing a bandwidth part carrying the respective PDCCH candidate. In some examples, the blind decoding configuration setting may identify a subset of PDCCH candidates to which measurements of power levels of DMRSs apply. The subset of PDCCH candidates may be included in one search space.

At block 904, the scheduled entity may determine if the blind decoding configuration setting is set to enable hybrid blind decoding (where hybrid blind decoding, as described herein, includes measuring a power level of a respective demodulation reference signal (DMRS) associated with a respective physical downlink control channel (PDCCH) candidate prior to performing blind decoding of the respective PDCCH candidate, and blind decoding the respective PDCCH candidate only if the measured power level is above a predetermined threshold).

If, at block 904, the scheduled entity determines that blind decoding configuration setting is not set to enable (e.g., set to forego) hybrid blind decoding (or is set to disable hybrid blind decoding), then at block 906, the scheduled entity may disable hybrid blind decoding (if hybrid blind decoding is presently enabled). The process may then return to the start and wait for receipt of a blind decoding configuration setting. The process thus facilitates semi-persistent scheduling of the hybrid blind decoding configuration. Alternatively, the blind decoding setting could be enabled or disabled by a MAC-CE.

If, at block 904, the scheduled entity determines that blind decoding configuration setting is set to enable hybrid blind decoding, then at block 908, the scheduled entity may enable, in response to the blind decoding configuration setting, the measuring of the power level of the respective DMRS associated with the respective PDCCH candidate prior to performing blind decoding of the respective PDCCH candidate.

At block 910, the scheduled entity may measure the power level of the respective DMRS. The measurement may be conducted, for example, to permit the scheduled entity to compare the measured power level of the respective DMRS to a predetermined threshold level.

At block 912, the scheduled entity may determine whether the measured power level of the respective DMRS is above the predetermined threshold. Persons of skill may recognize that a measured power level that is above a predetermined threshold may be considered a power level that satisfies the predetermined threshold. Conversely, a measured power level that is below the predetermined threshold may be considered a power level that does not satisfy the predetermined threshold. Furthermore, those of skill may determine, on a case-by-case or application-by-application basis whether a measured power level that is equal to the predetermined threshold may be considered a power level that satisfies or does not satisfy the predetermined threshold. If the power level is above the predetermined threshold, the scheduled entity may, at block 914, perform blind decoding of the respective PDCCH candidate (associated with the respective DMRS). Optionally, at block 916, the scheduled entity may increment a count (e.g., a value) of a counter that records a total number of blind decodes of PDCCH candidates. According to some aspects, the scheduled entity may increment the count of the counter that records the total number of blind decodes of PDCCH candidates only if the power level of the respective DMRS is above the predetermined threshold. Thereafter, the process 900 may end (or be repeated for additional DMRSs associated with additional respective PDCCH candidates until no additional respective PDCCH candidates are available).

Returning to block 912, if the power level is below the predetermined threshold, then at block 918, the scheduled entity may forego (e.g., not perform, abandon the performance of, skip over performance of) blind decoding of the respective PDCCH candidate. Optionally, at block 920, the scheduled entity may measure a power level of a next DMRS of a next PDCCH candidate (if a next PDCCH candidate is available) prior to performing blind decoding of the next PDCCH candidate. Thereafter, the process 900 may end (or be repeated for additional DMRSs associated with additional respective PDCCH candidates until no additional respective PDCCH candidates are available).

The foregoing of (e.g., the non-performance of, the abandoning of, the skipping over of) the blind decoding of the respective PDCCH candidate, at block 918, may serve to maintain a counter (e.g., the counter associated with block 916), which records a number (e.g., a quantity) at a value that is below a maximum number (e.g., a configured maximum number) of blind decodes. Maintaining the value below the maximum number of blind decodes may permit measurement of a power level of a next DMRS associated with a next PDCCH candidate. In some examples, the next PDCCH candidate may be in a second search space, different from a first search space (which may have included the earlier respective PDCCH candidate).

According to another aspect, a method of wireless communication at a scheduled entity may include receiving (similar to block 902), at the scheduled entity, a blind decoding configuration setting that enables measurement of a power level of a first DMRS associated with a first physical downlink control channel (PDCCH) candidate (where the measurement occurs prior to performing blind decoding of the first PDCCH candidate). The scheduled entity may then measure (similar to block 910) the power level of the first DMRS. The scheduled entity may thereafter forego performance of, in response to the first DMRS power level being below a predetermined threshold, blind decoding of the first PDCCH candidate (similar to block 918). In one example, the scheduled entity may perform, in response to a next DMRS power level being above the predetermined threshold, blind decoding of a next PDCCH candidate associated with the next DMRS power level.

According to one aspect, the scheduled entity may establish (e.g., initialize and maintain a count thereafter) a first counter (e.g., first counter 746 of FIG. 7) of a first number of blind decodes performed on a first subset of a plurality of PDCCH candidates that had foregone (e.g., did not have) performance of measurements of power levels of DMRSs prior to blind decoding (e.g., non-hybrid blind decoding). The scheduled entity may further establish (e.g., initialize and maintain a count thereafter) a second counter (e.g., second counter 748 of FIG. 7) of a second number of blind decodes performed on a second subset of the plurality of PDCCH candidates that did have measurements of power levels of DMRSs above the predetermined threshold (measured) prior to blind decoding (e.g., hybrid blind decoding). In one example, the scheduled entity may stop blind decoding when a sum of the first counter and the second counter is greater than a predetermined maximum number (e.g., a configured maximum number) of blind decodes. Furthermore, the scheduled entity may obtain the maximum number of blind decodes, a first multiplier of the first counter, and a second multiplier of the second counter. Thereafter, the scheduled entity may stop blind decoding when the sum of the first counter, weighted by the first multiplier, and the second counter, weighted by the second multiplier, is greater than the maximum number of blind decodes. The scheduled entity may obtain at least one of: the maximum number of blind decodes (e.g., a value representative of the maximum number of blind decodes); the first multiplier; or the second multiplier from control plane signaling (e.g., RRC signaling) or, for example, from a MAC-CE. At least one of: the maximum number of blind decodes (e.g., a value representative of the maximum number of blind decodes); the first multiplier; or the second multiplier may be configured to the scheduled entity and/or stored, for example, in parameter storage (e.g., 756 of FIG. 7) of the scheduled entity.

Figure 10:
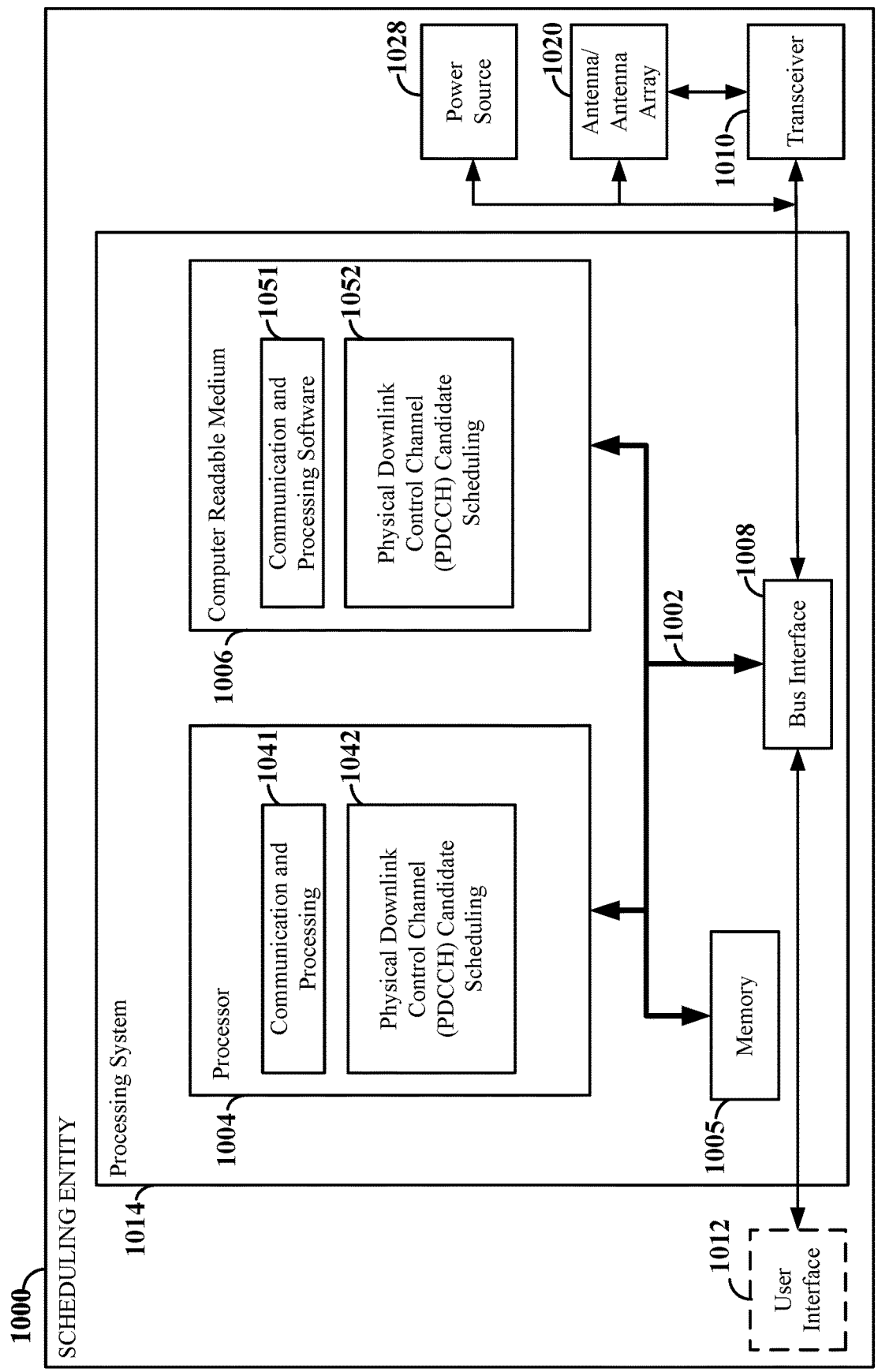
FIG. 10 is a block diagram illustrating an example of a hardware implementation of a scheduling entity employing a processing system according to some aspects of the disclosure.

FIG. 10 is a block diagram illustrating an example of a hardware implementation of scheduling entity 1000 employing a processing system 1014 according to some aspects of the disclosure. For example, the scheduling entity 1000 may be a base station, a gNB, or a network access node as illustrated in any one or more of FIG. 1, FIG. 2, and/or FIG. 4.

The processing system 1014 may be substantially the same as the processing system 714 illustrated in FIG. 7, including a bus interface 1008, a bus 1002, memory 1005, a processor 1004, and a computer-readable medium 1006. In accordance with various aspects of the disclosure, an element, or any portion of an element, or any combination of elements may be implemented with a processing system 1014 that includes one or more processors, such as processor 1004. Furthermore, the scheduling entity 1000 may include a user interface 1012, a transceiver 1010, an antenna or antenna array 1020, and a power source 1028 substantially similar to those described above in FIG. 7. The transceiver 1010 may be a wireless transceiver. The user interface 1012 (e.g., keypad, display, touch screen, speaker, microphone, control features, etc.) may be optional, and may be omitted in some examples. The processor 1004, as utilized in a scheduling entity 1000, may be used to implement any one or more of the processes described herein and illustrated, for example, in FIG. 11.

In some aspects of the disclosure, the processor 1004 may include communication and processing circuitry 1041 configured for various functions, including for example communicating with a scheduled entity (e.g., a UE, a wireless communication device), a network core (e.g., a 5G core network), other scheduling entities, or any other entity, such as, for example, local infrastructure or an entity communicating with the scheduling entity 1000 via the Internet, such as a network provider. The communication and processing circuitry 1041 (along with, for example, the transceiver 1010 and antenna/antenna array 1020) may further be configured other various functions, including, for example, transmitting to a scheduled entity a blind decoding configuration setting. According to some examples, the scheduling entity may enable (e.g., permit or cause a processor of a scheduled entity to execute certain instructions) hybrid blind decoding at the scheduled entity via the blind decoding configuration setting. As described herein, hybrid blind decoding includes a measurement, at a scheduled entity, of power levels of a plurality of demodulation reference signals (DMRSs) prior to (the scheduled entity's) blind decoding of a plurality of physical downlink control channel (PDCCH) candidates respectively associated with the plurality of DMRSs. In some examples, the communication and processing circuitry 1041 may include one or more hardware components that provide the physical structure that performs processes related to wireless communication (e.g., signal reception and/or signal transmission) and signal processing (e.g., processing a received signal and/or processing a signal for transmission). The one or more hardware components may further provide the physical structure that performs the transmitting, to the scheduled entity, of the blind decoding configuration setting, and the enabling, via the blind decoding configuration setting, of the measurement (at the scheduled entity) of the power levels of the plurality of DMRSs prior to blind decoding (by the scheduled entity) of the plurality of PDCCH candidates respectively associated with the plurality of DMRSs. In addition, the communication and processing circuitry 1041 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna or antenna array 1020 and the transceiver 1010. The communication and processing circuitry 1041 may further be configured to execute communication and processing software 1051 stored on the computer-readable medium 1006 to implement one or more functions described herein.

In some aspects of the disclosure, the processor 1004 may include physical downlink control channel (PDCCH) candidate scheduling circuitry 1042 configured for various functions, including, for example, scheduling a predetermined number of PDCCH candidates for blind decoding by the scheduled entity. In some examples, the predetermined number of PDCCH candidates may be based on at least one of: a number of CCEs included in at least one PDCCH candidate of the plurality of PDCCH candidates, a first number of OFDM symbols of a control resource set (CORESET) associated with the at least one PDCCH candidate of the plurality of PDCCH candidates, a second number of OFDM symbols of a virtual CORESET associated with the at least one PDCCH candidate of the plurality of PDCCH candidates, subcarrier spacing, or frequency range containing one or more bandwidth parts carrying one or more PDCCH candidate of the plurality of PDCCH candidates. In some examples, the PDCCH candidate scheduling circuitry 1042 may include one or more hardware components that provide the physical structure that performs processes related to performing the scheduling of the predetermined number of PDCCH candidates for blind decoding by the scheduled entity. The one or more hardware components may also provide the physical structure that performs processes related to performing the determining of the predetermined number of PDCCH candidates for blind decoding based on at least one of: the number of CCEs included in at least one PDCCH candidate of the plurality of PDCCH candidates, a first number of OFDM symbols of a control resource set (CORESET) associated with the at least one PDCCH candidate of the plurality of PDCCH candidates, a second number of OFDM symbols of a virtual CORESET associated with the at least one PDCCH candidate of the plurality of PDCCH candidates, subcarrier spacing, or a frequency range containing the one or more bandwidth parts carrying one or more PDCCH candidate of the plurality of PDCCH candidates. The PDCCH candidate scheduling circuitry 1042 may further be configured to execute PDCCH candidate scheduling software 1052 stored on the computer-readable medium 1006 to implement one or more functions described herein.

According to some aspects, the PDCCH candidate scheduling circuitry 1042 may further be configured for various functions, including, for example, dynamically indicating the blind decoding configuration setting based on at least one of: a scheduled entity specific basis, a scheduled entity group common basis, or a medium access control-control element (MAC-CE) basis. Still other functions may include identifying, in the blind decoding configuration setting, a subset of PDCCH candidates to which measurements of power levels of the plurality of DMRSs apply. In some examples, the subset of PDCCH candidates may be included in one search space.

According to still other aspects, the PDCCH candidate scheduling circuitry 1042 may further be configured for various functions, including, for example, transmitting an instruction to the scheduled entity to compare a configured maximum number of blind decodings to a summation of: a first number of CCEs that have channel estimation determined without measurement of a power level of the DMRS prior to PDCCH candidate blind decoding by the scheduled entity, and a second number of CCEs that have channel estimation determined with measurement of the power level of the DMRS prior to PDCCH candidate blind decoding by the scheduled entity, and stopping blind decoding when a summation result is greater than the configured maximum number of blind decodings. In some examples, the first number and/or the second number may be determined on at least one of: a per slot basis, or a per group of consecutive slots basis.

Figure 11:
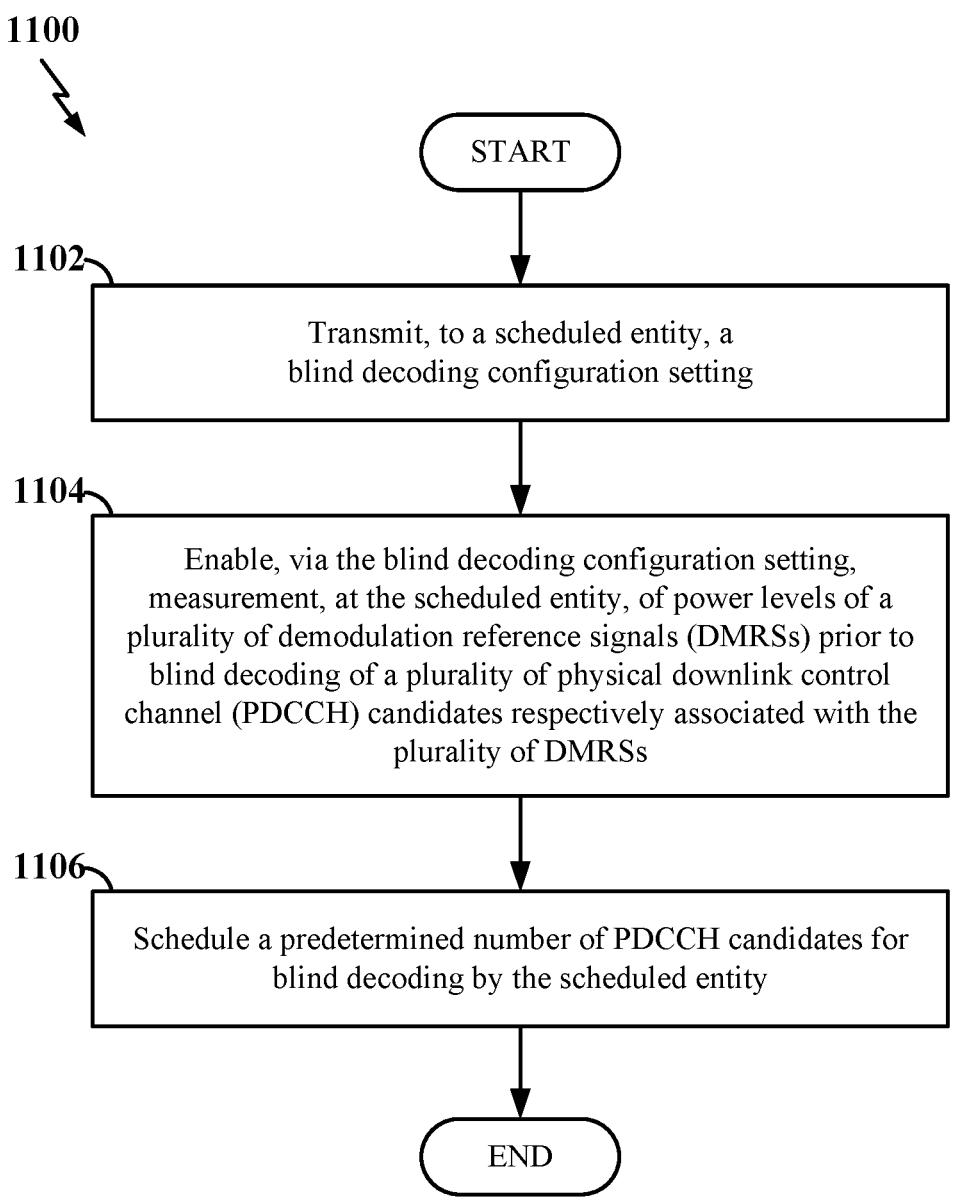
FIG. 11 is a flow chart illustrating an exemplary process of wireless communication at a scheduling entity according to some aspects of the disclosure.

FIG. 11 is a flow chart illustrating an exemplary process 1100 (e.g., a method) of wireless communication at a scheduling entity (e.g., a base station, a gNB, a network access node) in accordance with some aspects of the disclosure. As described below, some or all illustrated features may be omitted in a particular implementation within the scope of the present disclosure, and some illustrated features may not be required for implementation of all examples. In some examples, the process 1100 may be carried out by the scheduling entity 1000 illustrated in FIG. 10. In some examples, the process 1100 may be carried out by any suitable apparatus or means for carrying out the functions or algorithms described herein.

At block 1102, the scheduling entity may transmit, to a scheduled entity, a blind decoding configuration setting. For example, the communication and processing circuitry 1041, the transceiver 1010, and/or the antenna array 1020, shown and described above in connection with FIG. 10, may provide a means to transmit to the scheduled entity, the blind decoding configuration setting.

Additional processes that may occur before or after the transmitting at block 1102 may include, for example, dynamically indicating the blind decoding configuration setting based on at least one of: a scheduled entity specific basis, a scheduled entity group common basis, or a medium access control-control element (MAC-CE) basis. Still other additional processes may include, for example, identifying, in the blind decoding configuration setting, a subset of PDCCH candidates to which measurements of power levels of the plurality of DMRSs apply. The blind decoding configuration setting may be a semi-persistent setting or may be configured to the scheduled entity using a MAC-CE, for example. In some examples, the subset of PDCCH candidates may be included in one search space. The PDCCH candidate scheduling circuitry 1042, as shown and described above in connection with FIG. 10, may provide a means to perform these additional processes.

At block 1104, the scheduling entity may enable, via the blind decoding configuration setting, measurement, at the scheduled entity, of power levels of a plurality of demodulation reference signals (DMRSs) prior to blind decoding of a plurality of physical downlink control channel (PDCCH) candidates respectively associated with the plurality of DMRSs. In other words, at block 1104, the scheduling entity may enable hybrid blind decoding, via the blind decoding configuration setting, at the scheduled entity. For example, the communications and processing circuitry 1041, as shown and described above in connection with FIG. 10, may provide a means to enable, via the blind decoding configuration setting, the measurement, at the scheduled entity, of the power levels of the plurality of demodulation reference signals (DMRSs) prior to blind decoding of the plurality of physical downlink control channel (PDCCH) candidates respectively associated with the plurality of DMRSs.

At block 1106, the scheduling entity may schedule a predetermined number of PDCCH candidates for blind decoding by the scheduled entity. For example, the scheduling entity may determine the predetermined number of PDCCH candidates for blind decoding based on at least one of: a number of CCEs included in at least one PDCCH candidate of the plurality of PDCCH candidates, a first number of OFDM symbols of a control resource set (CORESET) associated with the at least one PDCCH candidate of the plurality of PDCCH candidates, a second number of OFDM symbols of a virtual CORESET associated with the at least one PDCCH candidate the plurality of PDCCH candidates, subcarrier spacing, or a frequency range containing one or more bandwidth parts carrying one or more PDCCH candidate of the plurality of PDCCH candidates.

For example, the PDCCH candidate scheduling circuitry 1042, as shown and described above in connection with FIG. 10, may provide a means to schedule the predetermined number of PDCCH candidates for blind decoding by the scheduled entity. The PDCCH candidate scheduling circuitry 1042, as shown and described above in connection with FIG. 10, may provide a means for determining the predetermined number of PDCCH candidates for blind decoding based on at least one of: a number of CCEs included in at least one PDCCH candidate of the plurality of PDCCH candidates, a first number of OFDM symbols of a control resource set (CORESET) associated with the at least one PDCCH candidate of the plurality of PDCCH candidates, a second number of OFDM symbols of a virtual CORESET associated with the at least one PDCCH candidate of the plurality of PDCCH candidates, subcarrier spacing, or a frequency range containing the one or more bandwidth parts carrying one or more PDCCH candidate of the plurality of PDCCH candidates.

According to some aspects, additional processes that the scheduling entity may perform may include, for example, transmitting an instruction to the scheduled entity to compare a configured maximum number of blind decodings to a summation of: a first number of CCEs that have channel estimation determined without measurement pf power level of the DMRS prior to PDCCH candidate blind decoding by the scheduled entity (e.g., non-hybrid blind decoding), and a second number of CCEs that have channel estimation determined with measurement pf power level of the DMRS prior to PDCCH candidate blind decoding by the scheduled entity (e.g., hybrid blind decoding as described herein). The instruction may also instruct the scheduled entity to stop blind decoding when the summation result is greater than the configured maximum number of blind decodings. According to some aspects, the first number and/or the second number may be determined on at least one of: a per slot basis, or a per group of consecutive slots basis. For example, the PDCCH candidate scheduling circuitry 1042, as shown and described above in connection with FIG. 10, may also provide a means to perform these additional processes.

Of course, in the above examples, the circuitry included in the processor 704 and/or 1004 is merely provided as an example, and other means for carrying out the described functions may be included within various aspects of the present disclosure, including but not limited to the instructions stored in the computer-readable medium 706 and/or 1006, or any other suitable apparatus or means described in any one of the FIGS. 1, 2, 4, 7, and/or 10, and utilizing, for example, the processes and/or algorithms described herein in relation to FIG. 8, FIG. 9, and/or FIG. 11.

The following provides an overview of aspects of the present disclosure:

Aspect 1: A method of wireless communication, the method comprising, at a scheduled entity: measuring a power level of a respective demodulation reference signal (DMRS) prior to a blind decoding of a respective physical downlink control channel (PDCCH) candidate associated with the respective DMRS, and at least one of: performing the blind decoding of the respective PDCCH candidate if the power level of the respective DMRS is above a predetermined threshold, or foregoing the blind decoding of the respective PDCCH candidate if the power level of the respective DMRS is below the predetermined threshold.

Aspect 2: The method of aspect 1, further comprising at least one of: incrementing a count of a counter that records a total number of blind decodes of PDCCH candidates only if the power level of the respective DMRS is above the predetermined threshold, or measuring a next power level of a next respective DMRS associated with a next respective PDCCH candidate, and performing a next blind decoding of the next respective PDCCH candidate if the next power level of the next respective DMRS is above the predetermined threshold.

Aspect 3: The method of aspect 1 or 2, wherein the respective PDCCH candidate is in a first search space, the method further comprising: measuring a second power level of a second DMRS associated with a second PDCCH candidate in a second search space, different from the first search space:

Aspect 4: The method of any of aspects 1 through 3, further comprising: receiving a blind decoding configuration setting, and enabling, in response to the blind decoding configuration setting, the measuring of the power level of the respective DMRS prior to the blind decoding of the respective PDCCH candidate.

Aspect 5: The method of aspect 4, wherein the blind decoding configuration setting is determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CORESET associated with the respective PDCCH candidate, subcarrier spacing, or a frequency range containing a bandwidth part carrying the respective PDCCH candidate.

Aspect 6: The method of aspect 4, wherein the blind decoding configuration setting identifies a subset of PDCCH candidates to which measurements of power levels of DMRSs apply.

Aspect 7: The method of aspect 6, wherein the subset of PDCCH candidates is included in one search space.

Aspect 8: A scheduled entity in a wireless communication network, comprising: a wireless transceiver, a memory, and a processor communicatively coupled to the wireless transceiver and the memory, wherein the processor and the memory are configured to: measure a power level of a respective demodulation reference signal (DMRS) prior to a blind decoding of a respective physical downlink control channel (PDCCH) candidate associated with the respective DMRS, and at least one of: perform the blind decoding of the respective PDCCH candidate if the power level of the respective DMRS is above a predetermined threshold, or forego the blind decoding of the respective PDCCH candidate if the power level of the respective DMRS is below the predetermined threshold.

Aspect 9: The scheduled entity of aspect 8, wherein the processor and the memory are further configured to at least one of: increment a count of a counter that records a total number of blind decodes of PDCCH candidates only if the power level of the respective DMRS is above the predetermined threshold, or measure a next power level of a next respective DMRS associated with a next respective PDCCH candidate, and perform a next blind decoding of the next respective PDCCH candidate if the next power level of the next respective DMRS is above the predetermined threshold.

Aspect 10: The scheduled entity of aspect 8 or 9, wherein the respective PDCCH candidate is in a first search space, and the processor and the memory are further configured to: measure a second power level of a second DMRS associated with a second PDCCH candidate in a second search space, different from the first search space.

Aspect 11: The scheduled entity of any of aspects 8 through 10, wherein the processor and the memory are further configured to: receive a blind decoding configuration setting, and enable, in response to the blind decoding configuration setting, the measuring of the power level of the respective DMRS prior to the blind decoding of the respective PDCCH candidate.

Aspect 12: The scheduled entity of aspect 11, wherein the blind decoding configuration setting is determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CORESET associated with the respective PDCCH candidate, subcarrier spacing, or a frequency range containing a bandwidth part carrying the respective PDCCH candidate.

Aspect 13: The scheduled entity of aspect 11, wherein the blind decoding configuration setting identifies a subset of PDCCH candidates to which measurements of power levels of DMRSs apply.

Aspect 14: The scheduled entity of aspect 13, wherein the subset of PDCCH candidates is included in one search space.

Aspect 15: A method of wireless communication, the method comprising, at a scheduling entity: transmitting, to a scheduled entity, a blind decoding configuration setting, enabling, via the blind decoding configuration setting, measurements, at the scheduled entity, of power levels of a plurality of demodulation reference signals (DMRSs) prior to blind decoding of a plurality of physical downlink control channel (PDCCH) candidates respectively associated with the plurality of DMRSs, and scheduling a predetermined number of PDCCH candidates for blind decoding by the scheduled entity.

Aspect 16: The method of aspect 15, further comprising: determining the predetermined number of PDCCH candidates for blind decoding based on at least one of: a number of CCEs included in at least one PDCCH candidate of the plurality of PDCCH candidates, a first number of orthogonal frequency division multiplex (OFDM) symbols of a control resource set (CORESET) associated with the at least one PDCCH candidate of the plurality of PDCCH candidates, a second number of OFDM symbols of a virtual CORESET associated with the at least one PDCCH candidate of the plurality of PDCCH candidates, subcarrier spacing, or a frequency range containing one or more bandwidth parts carrying one or more PDCCH candidate of the plurality of PDCCH candidates.

Aspect 17: The method of aspect 15 or 16, further comprising: dynamically indicating the blind decoding configuration setting based on at least one of: a scheduled entity specific basis, a scheduled entity group common basis, or a medium access control-control element (MAC-CE) basis.

Aspect 18: The method of any of aspects 15 through 17, further comprising: identifying, in the blind decoding configuration setting, a subset of PDCCH candidates to which measurements of power levels of the plurality of DMRSs apply.

Aspect 19: The method of aspect 18, wherein the subset of PDCCH candidates is included in one search space.

Aspect 20: The method of any of aspects 15 through 19, further comprising: transmitting an instruction to the scheduled entity to compare a configured maximum number of blind decodings to a summation of: a first number of CCEs that have channel estimation determined without measurements of power levels of the plurality of DMRSs prior to PDCCH candidate blind decoding by the scheduled entity, and a second number of CCEs that have channel estimation determined with measurements of power levels of the plurality of DMRSs prior to PDCCH candidate blind decoding by the scheduled entity, and stopping blind decoding when a summation result is greater than the configured maximum number of blind decodings.

Aspect 21: The method of aspect 20, wherein the first number and/or the second number are determined on at least one of: a per slot basis, or a per group of consecutive slots basis.

Aspect 22: A scheduling entity in a wireless communication network, comprising: a wireless transceiver, a memory, and a processor communicatively coupled to the wireless transceiver and the memory, wherein the processor and the memory are configured to: transmit, to a scheduled entity, a blind decoding configuration setting, enable, via the blind decoding configuration setting, measurements, at the scheduled entity, of power levels of a plurality of demodulation reference signals (DMRSs) prior to blind decoding of a plurality of physical downlink control channel (PDCCH) candidates respectively associated with the plurality of DMRSs, and schedule a predetermined number of PDCCH candidates for blind decoding by the scheduled entity.

Aspect 23: The scheduling entity of aspect 22, wherein the processor and the memory are further configured to: determine the predetermined number of PDCCH candidates for blind decoding based on at least one of: a number of CCEs included in at least one PDCCH candidate of the plurality of PDCCH candidates, a first number of orthogonal frequency division multiplex (OFDM) symbols of a control resource set (CORESET) associated with the at least one PDCCH candidate of the plurality of PDCCH candidates, a second number of OFDM symbols of a virtual CORESET associated with the at least one PDCCH candidate of the plurality of PDCCH candidates, subcarrier spacing, or a frequency range containing one or more bandwidth parts carrying one or more PDCCH candidate of the plurality of PDCCH candidates.

Aspect 24: The scheduling entity of aspect 22 or 23, wherein the processor and the memory are further configured to: dynamically indicate the blind decoding configuration setting based on at least one of: a scheduled entity specific basis, a scheduled entity group common basis, or a medium access control-control element (MAC-CE) basis.

Aspect 25: The scheduling entity of any of aspects 22 through 24, wherein the processor and the memory are further configured to: identify, in the blind decoding configuration setting, a subset of PDCCH candidates to which measurements of power levels of the plurality of DMRSs apply.

Aspect 26: The scheduling entity of aspect 25, wherein the subset of PDCCH candidates is included in one search space.

Aspect 27: The scheduling entity of any of aspects 22 through 26, wherein the processor and the memory are further configured to: transmit an instruction to the scheduled entity to compare a configured maximum number of blind decodings to a summation of: a first number of CCEs that have channel estimation determined without measurements of power levels of the plurality of DMRSs prior to PDCCH candidate blind decoding by the scheduled entity, and a second number of CCEs that have channel estimation determined with measurements of power levels of the plurality of DMRSs prior to PDCCH candidate blind decoding by the scheduled entity, and stop blind decoding when a summation result is greater than the configured maximum number of blind decodings.

Aspect 28: The scheduling entity of aspect 27, wherein the first number and/or the second number are determined on at least one of: a per slot basis, or a per group of consecutive slots basis.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The phrase A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, the method comprising, at a scheduled entity:
  receiving a blind decoding configuration setting configured to either enable or disable measurements, at the scheduled entity, of respective power levels of a plurality of demodulation reference signals (DMRSs) prior to blind decoding of a plurality of physical downlink control channel (PDCCH) candidates respectively associated with the plurality of DMRSs;
  enabling, in response to the blind decoding configuration setting enabling the measurements, the measurements of the respective power levels of the plurality of DMRSs prior to the blind decoding of the plurality of PDCCH candidates respectively associated with the plurality of DMRSs;
  measuring a power level of a respective DMRS of the plurality of DMRSs prior to a blind decoding of a respective PDCCH candidate of the plurality of PDCCH candidates associated with the respective DMRS; and
  at least one of:
    performing the blind decoding of the respective PDCCH candidate if the power level of the respective DMRS is above a predetermined threshold, or
    foregoing the blind decoding of the respective PDCCH candidate if the power level of the respective DMRS is below the predetermined threshold,
  wherein the blind decoding configuration setting is determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CO RESET associated with the respective PDCCH candidate, or a frequency range containing a bandwidth part carrying the respective PDCCH candidate.

2. The method of claim 1, further comprising at least one of:
incrementing a count of a counter that records a total number of blind decodes of PDCCH candidates, including the respective PDCCH candidate, only if the power level of the respective DMRS is above the predetermined threshold, or
measuring a next power level of a next respective DMRS associated with a next respective PDCCH candidate, and in association with the measuring of the next power level,
performing a next blind decoding of the next respective PDCCH candidate if the next power level of the next respective DMRS is above the predetermined threshold.

3. The method of claim 1, wherein the respective PDCCH candidate is in a first search space, the method further comprising:
measuring a second power level of a second DMRS associated with a second PDCCH candidate in a second search space, different from the first search space.

4. The method of claim 1, wherein the blind decoding configuration setting identifies a subset of PDCCH candidates of the plurality of PDCCH candidates to which DMRS power level measurements apply.

5. The method of claim 4, wherein the subset of PDCCH candidates is included in one search space.

6. A scheduled entity in a wireless communication network, comprising:
a wireless transceiver;
a memory; and
a processor communicatively coupled to the wireless transceiver and the memory, wherein the processor is configured to:
receive a blind decoding configuration setting configured to either enable or disable measurements, at the scheduled entity, of respective power levels of a plurality of demodulation reference signals (DMRSs) prior to blind decoding of a plurality of physical downlink control channel (PDCCH) candidates respectively associated with the plurality of DMRSs;
enable, in response to the blind decoding configuration setting enabling the measurements, the measurements of the respective power levels of the plurality of DMRSs prior to the blind decoding of the plurality of PDCCH candidates respectively associated with the plurality of DMRSs;
measure a power level of a respective DMRS of the plurality of DMRSs prior to a blind decoding of a respective PDCCH candidate of the plurality of PDCCH candidates associated with the respective DMRS; and
at least one of:
perform the blind decoding of the respective PDCCH candidate if the power level of the respective DMRS is above a predetermined threshold, or
forego the blind decoding of the respective PDCCH candidate if the power level of the respective DMRS is below the predetermined threshold,
wherein the blind decoding configuration setting is determined based on at least one of: a number of control channel elements (CCEs) of the respective PDCCH candidate, a first number of orthogonal frequency division multiplex (OFDM) symbols of a control resource set (CORESET) associated with the respective PDCCH candidate, a second number of OFDM symbols of a virtual CO RESET associated with the respective PDCCH candidate, or a frequency range containing a bandwidth part carrying the respective PDCCH candidate.

7. The scheduled entity of claim 6, wherein the processor is further configured to at least one of:
increment a count of a counter that records a total number of blind decodes of PDCCH candidates, including the respective PDCCH candidate, only if the power level of the respective DMRS is above the predetermined threshold, or
measure a next power level of a next respective DMRS associated with a next respective PDCCH candidate, and in association with the measure of the next power level,
perform a next blind decoding of the next respective PDCCH candidate if the next power level of the next respective DMRS is above the predetermined threshold.

8. The scheduled entity of claim 6, wherein the respective PDCCH candidate is in a first search space, and the processor is further configured to:
measure a second power level of a second DMRS associated with a second PDCCH candidate in a second search space, different from the first search space.

9. The scheduled entity of claim 6, wherein the blind decoding configuration setting identifies a subset of PDCCH candidates of the plurality of PDCCH candidates to which DMRS power level measurements apply.

10. The scheduled entity of claim 9, wherein the subset of PDCCH candidates is included in one search space.

11. A method of wireless communication, the method comprising, at a scheduling entity:
transmitting, to a scheduled entity, a blind decoding configuration setting configured to either enable or disable measurements, at the scheduled entity, of respective power levels of a plurality of demodulation reference signals (DMRSs) prior to blind decoding of a plurality of physical downlink control channel (PDCCH) candidates respectively associated with the plurality of DMRSs;
enabling, via the blind decoding configuration setting, the measurements, at the scheduled entity, of the respective power levels of the plurality of DMRSs prior to the blind decoding of the plurality of PDCCH candidates respectively associated with the plurality of DMRSs;
scheduling a predetermined number of PDCCH candidates for blind decoding by the scheduled entity; and
determining the blind decoding configuration setting based on at least one of: a number of control channel elements (CCEs) Included in at least one PDCCH candidate of the plurality of PDCCH candidates, a first number of orthogonal frequency division multiplex (OFDM) symbols of a control resource set (CO RESET) associated with the at least one PDCCH candidate of the plurality of PDCCH candidates, a second number of OFDM symbols of a virtual CO RESET associated with the at least one PDCCH candidate of the plurality of PDCCH candidates, or a frequency range containing one or more bandwidth parts carrying one or more PDCCH candidate of the plurality of PDCCH candidates.

12. The method of claim 11, further comprising:
dynamically indicating the blind decoding configuration setting based on at least one of:
a scheduled entity specific basis,
a scheduled entity group common basis, or
a medium access control-control element (MAC-CE) basis.

13. The method of claim 11, further comprising:
identifying, in the blind decoding configuration setting, a subset of PDCCH candidates of the plurality of PDCCH candidates to which DMRS power level measurements apply.

14. The method of claim 13, wherein the subset of PDCCH candidates is included in one search space.

15. The method of claim 11, further comprising:
transmitting an instruction to the scheduled entity to compare a configured maximum number of blind decodings to a summation of:
a first number of control channel elements (CCEs) that have channel estimation determined without the measurements of the respective power levels of the plurality of DMRSs prior to the blind decoding of the plurality of PDCCH candidates by the scheduled entity, and
a second number of CCEs that have channel estimation determined with the measurements of the respective power levels of the plurality of DMRSs prior to the blind decoding of the plurality of PDCCH candidates by the scheduled entity; and
stopping the blind decoding when a summation result is greater than the configured maximum number of blind decodings.

16. The method of claim 15, wherein at least one of the first number or the second number are determined on at least one of:
a per slot basis, or
a per group of consecutive slots basis.

17. A scheduling entity in a wireless communication network, comprising:
a wireless transceiver;
a memory; and
a processor communicatively coupled to the wireless transceiver and the memory, wherein the processor is configured to:
transmit, to a scheduled entity, a blind decoding configuration setting configured to either enable or disable measurements, at the scheduled entity, of respective power levels of a plurality of demodulation reference signals (DMRSs) prior to blind decoding of a plurality of physical downlink control channel (PDCCH) candidates respectively associated with the plurality of DMRSs;
enable, via the blind decoding configuration setting, the measurements, at the scheduled entity, of the respective power levels of the plurality of DMRSs prior to the blind decoding of the plurality of PDCCH candidates respectively associated with the plurality of DMRSs;
schedule a predetermined number of PDCCH candidates for blind decoding by the scheduled entity; and
determine the blind decoding configuration setting based on at least one of: a number of control channel elements (CCEs) included in at least one PDCCH candidate of the plurality of PDCCH candidates, a first number of orthogonal frequency division multiplex (OFDM) symbols of a control resource set (CORESET) associated with the at least one PDCCH candidate of the plurality of PDCCH candidates, a second number of OFDM symbols of a virtual CO RESET associated with the at least one PDCCH candidate of the plurality of PDCCH candidates, or a frequency range containing one or more bandwidth parts carrying one or more PDCCH candidate of the plurality of PDCCH candidates.

18. The scheduling entity of claim 17, wherein the processor is further configured to:
dynamically indicate the blind decoding configuration setting based on at least one of:
a scheduled entity specific basis,
a scheduled entity group common basis, or
a medium access control-control element (MAC-CE) basis.

19. The scheduling entity of claim 17, wherein the processor is further configured to:
identify, in the blind decoding configuration setting, a subset of PDCCH candidates of the plurality of PDCCH candidates to which DMRS power level measurements apply.

20. The scheduling entity of claim 19, wherein the subset of PDCCH candidates is included in one search space.

21. The scheduling entity of claim 17, wherein the processor is further configured to:
transmit an instruction to the scheduled entity to compare a configured maximum number of blind decodings to a summation of:
a first number of control channel elements (CCEs) that have channel estimation determined without the measurements of the respective power levels of the plurality of DMRSs prior to the blind decoding of the plurality of PDCCH candidates by the scheduled entity, and
a second number of CCEs that have channel estimation determined with the measurements of the respective power levels of the plurality of DMRSs prior to the blind decoding of the plurality of PDCCH candidates by the scheduled entity; and
stop the blind decoding when a summation result is greater than the configured maximum number of blind decodings.

22. The scheduling entity of claim 21, wherein at least one of the first number or the second number are determined on at least one of:
a per slot basis, or
a per group of consecutive slots basis.

* * * * *